Dec. 16, 1969  R. E. CAMPBELL ET AL  3,484,821
SLEEVE PRESSING APPARATUS
Filed March 25, 1968  12 Sheets-Sheet 1
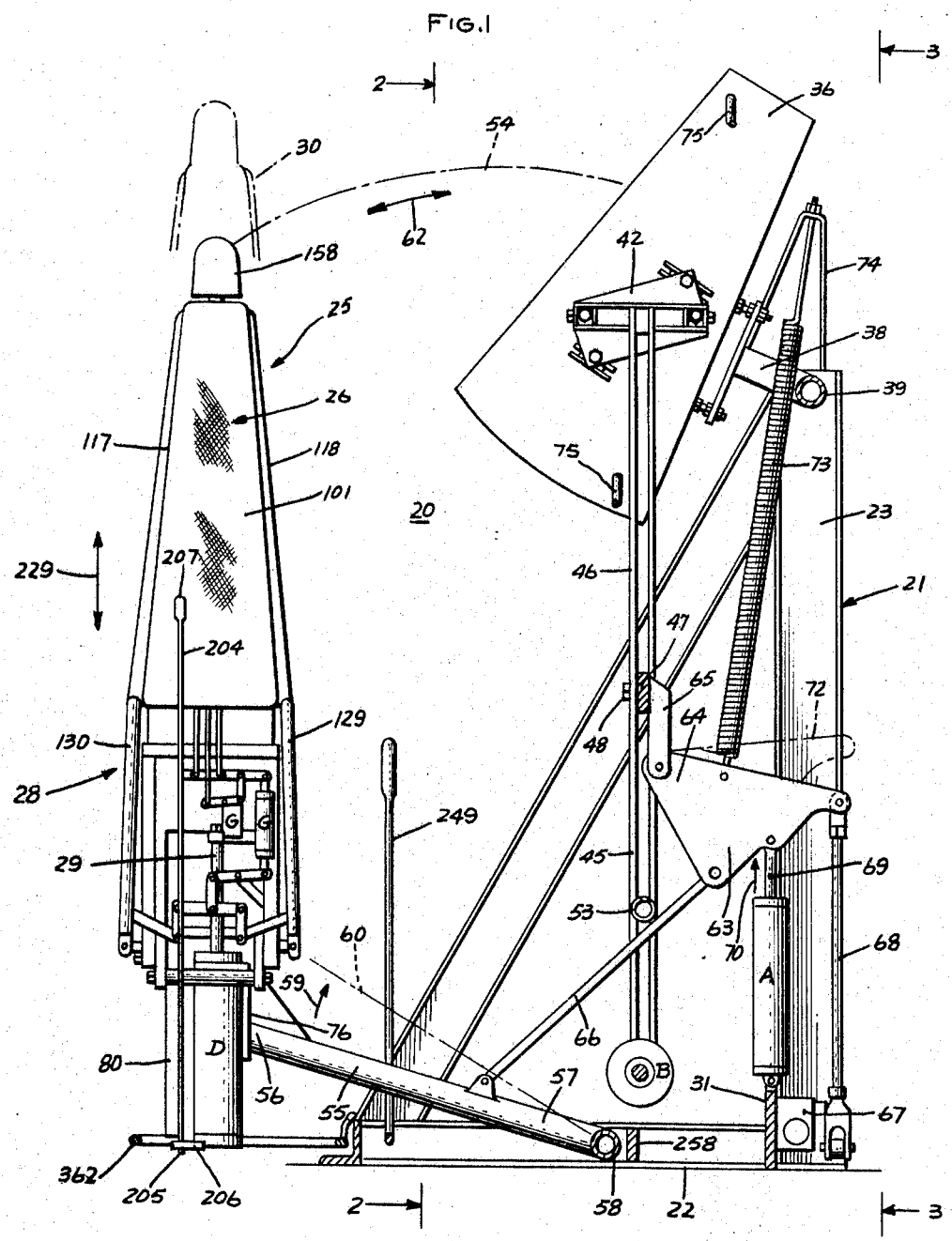
INVENTORS:
ROLLIN E. CAMPBELL,
HARRY D. FORSE,
by Hood, Gust & Irish
ATTORNEYS.

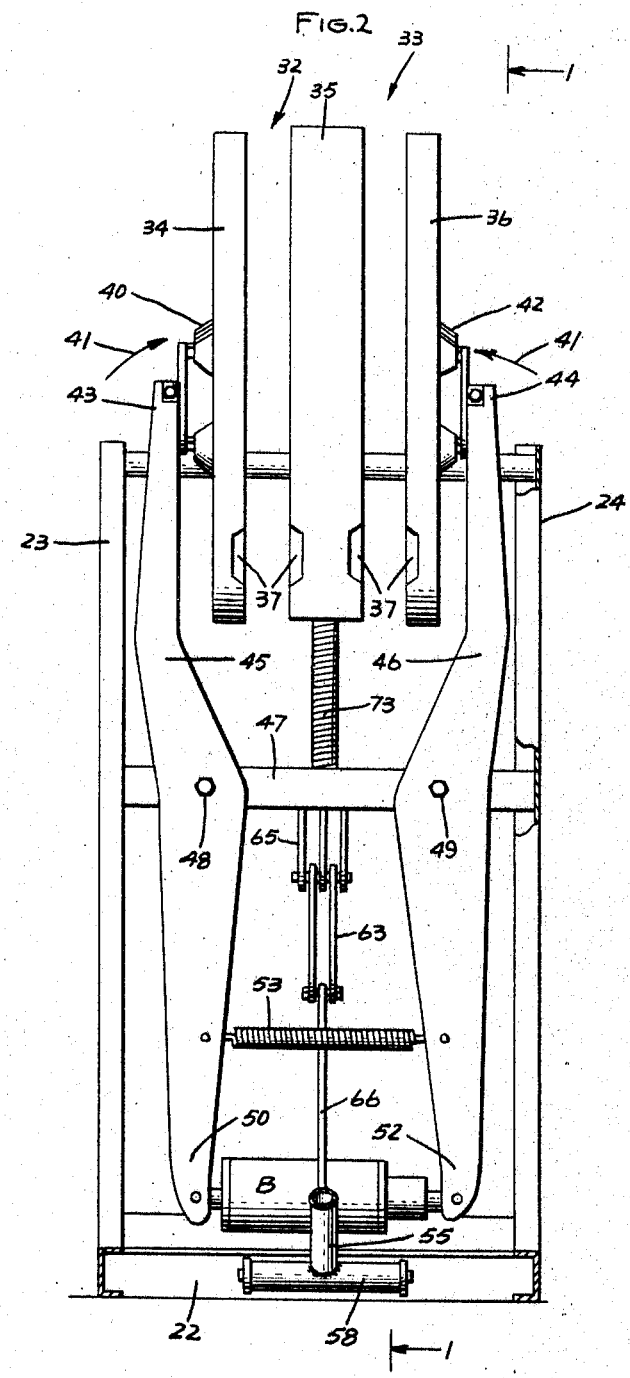

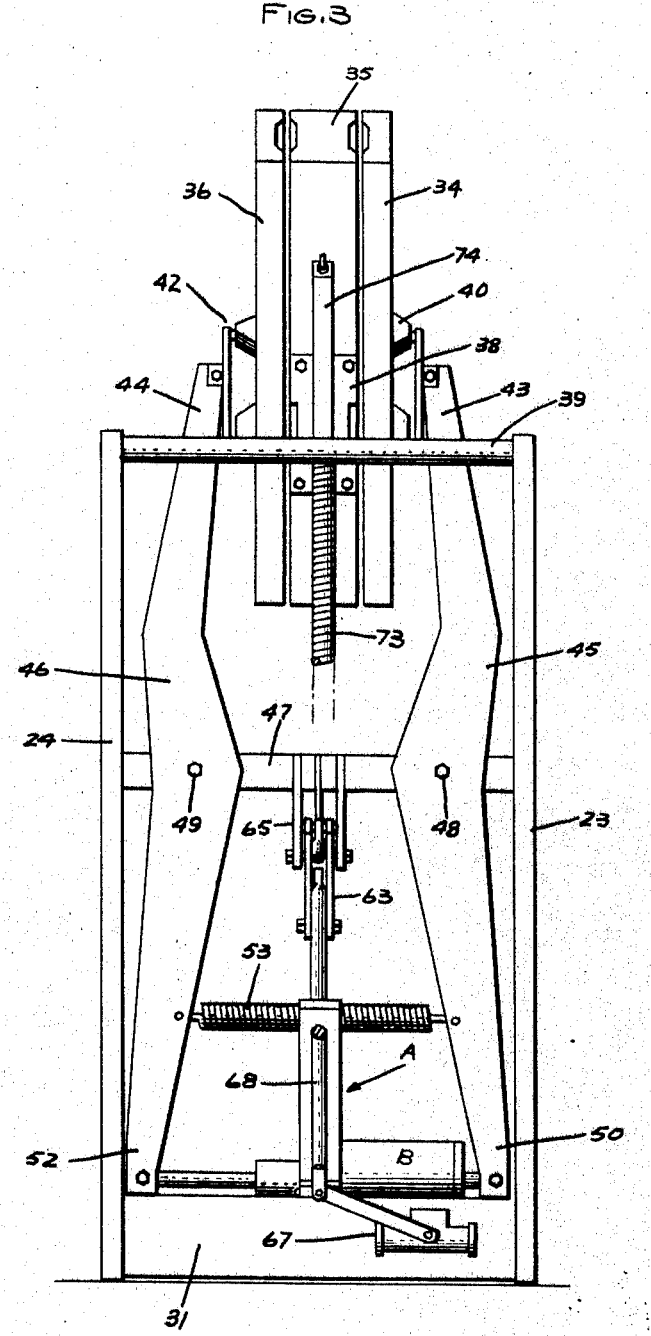

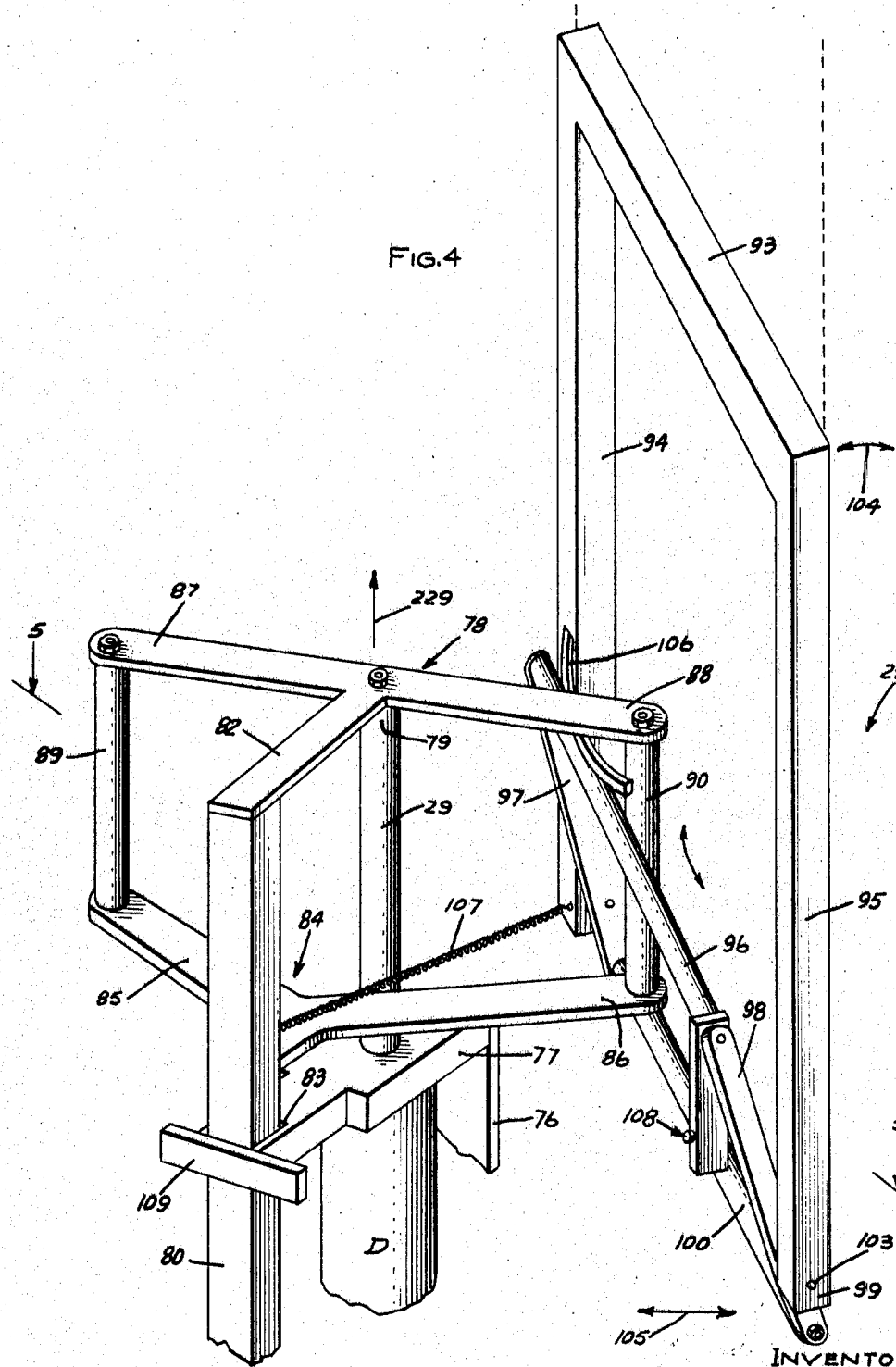

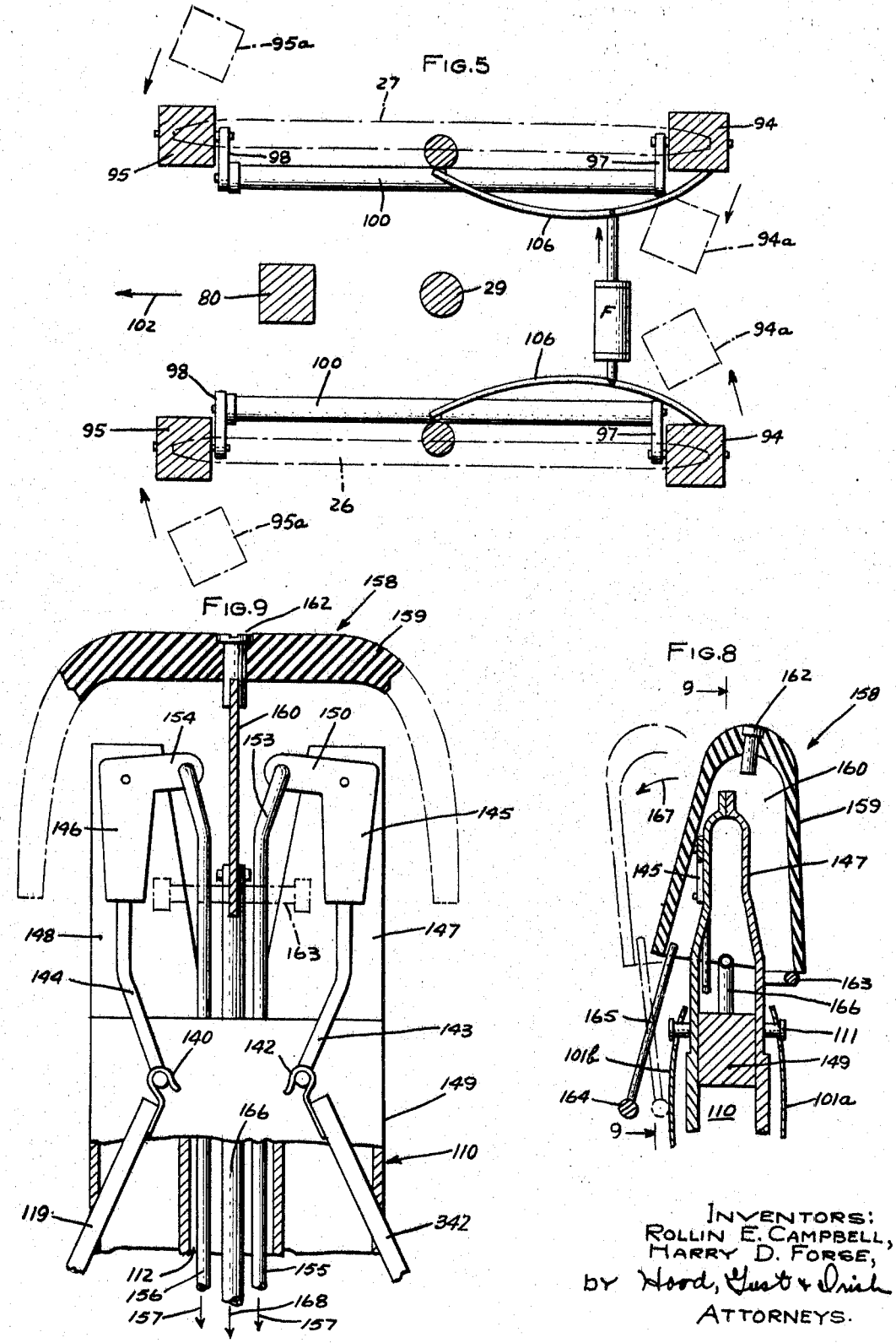

Dec. 16, 1969  R. E. CAMPBELL ET AL  3,484,821
SLEEVE PRESSING APPARATUS
Filed March 25, 1968  12 Sheets-Sheet 6
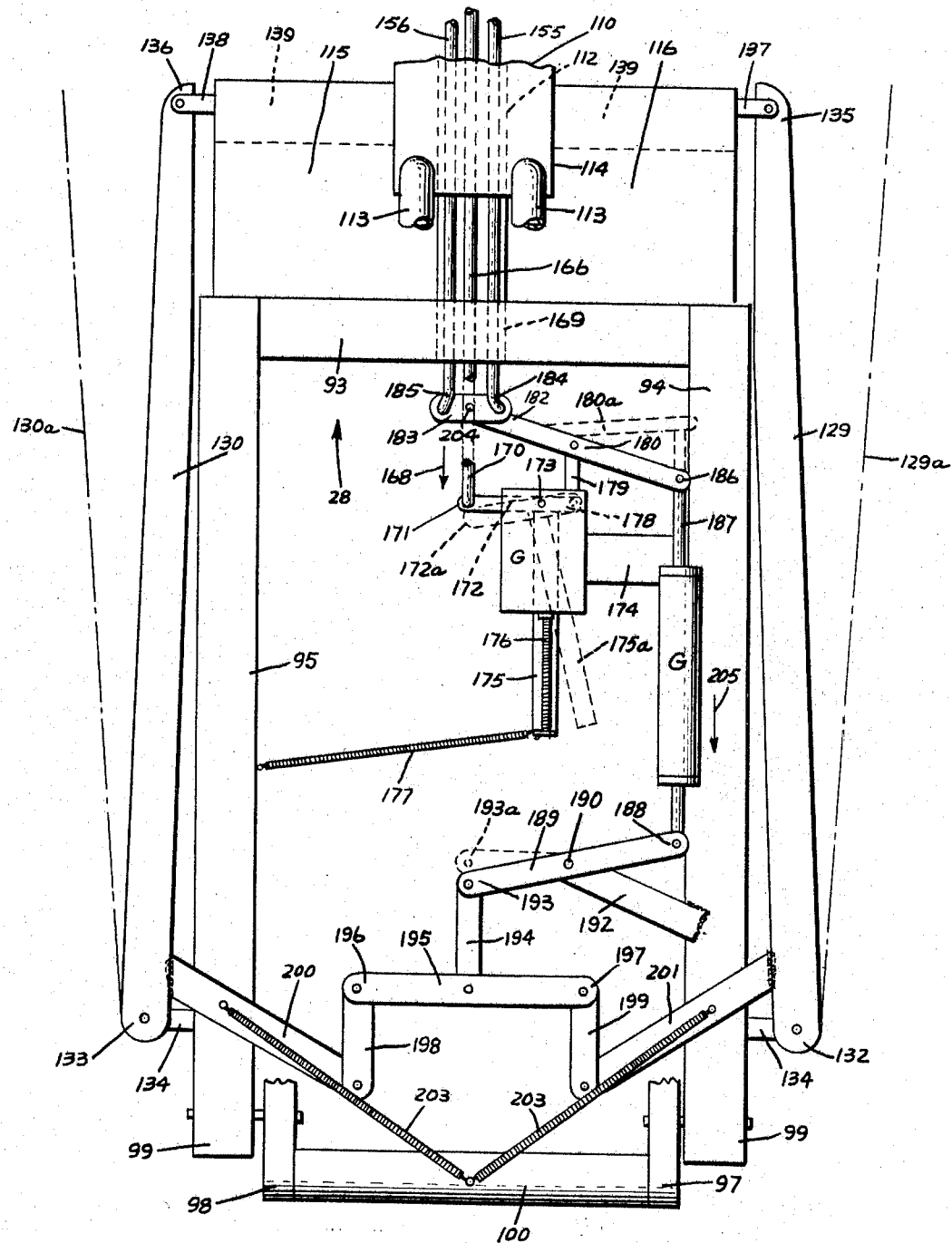
INVENTORS:
ROLLIN E. CAMPBELL,
HARRY D. FORSE,
by Wood, Herron & Evans
ATTORNEYS.

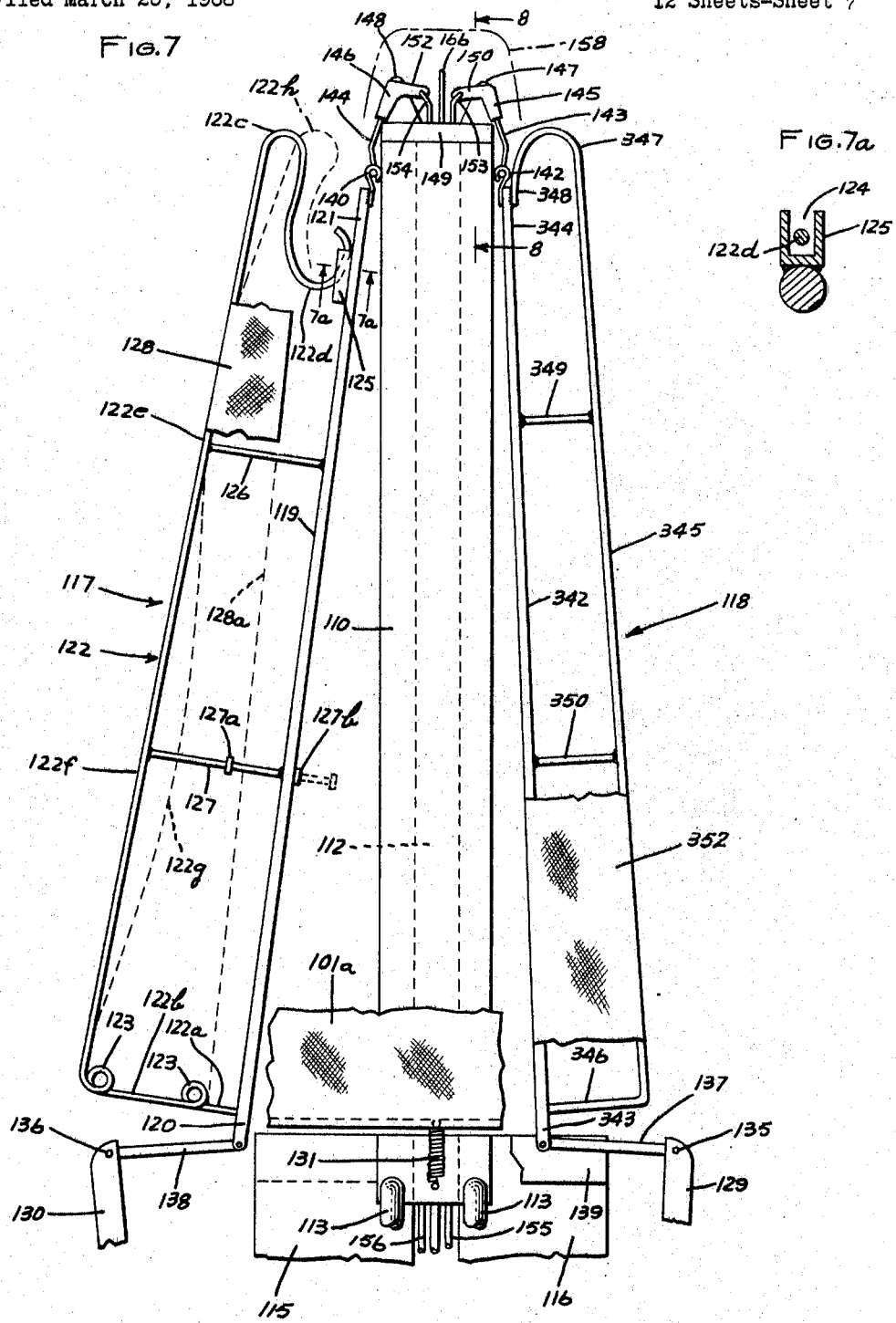

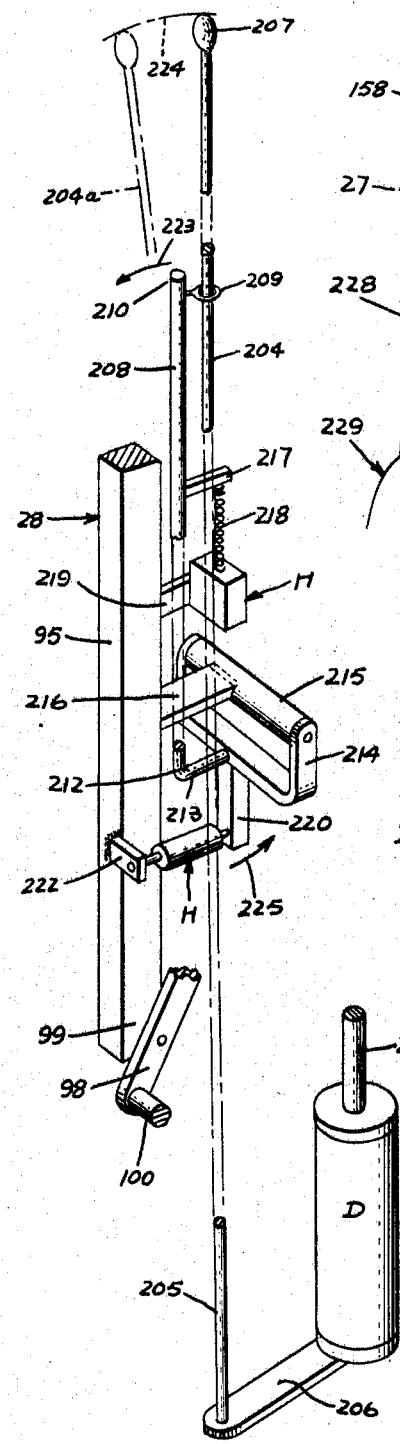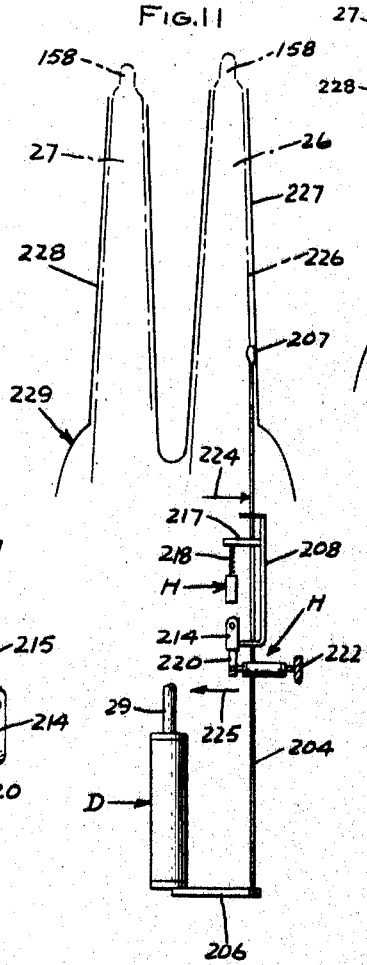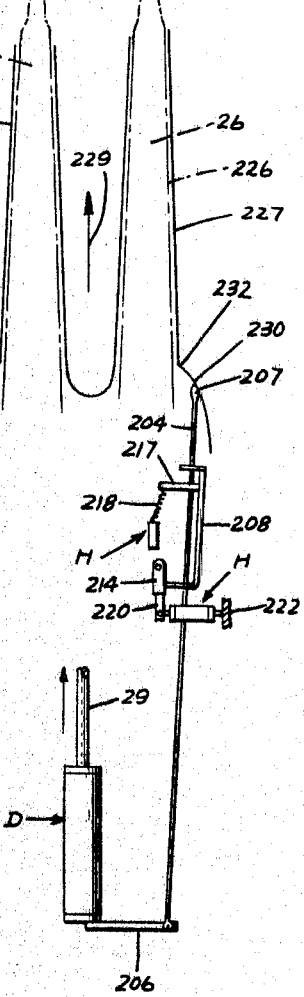

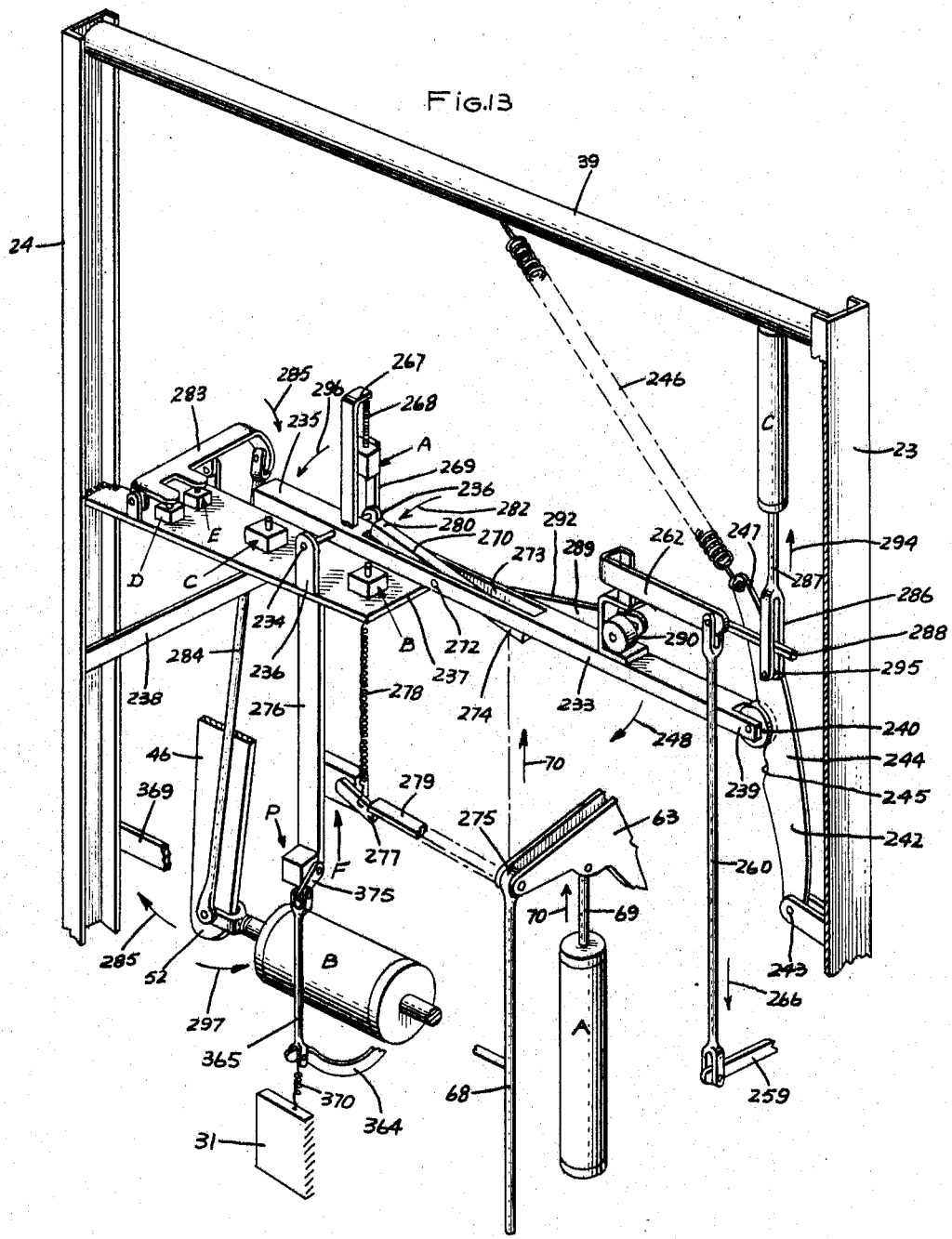

Dec. 16, 1969  R. E. CAMPBELL ET AL  3,484,821
SLEEVE PRESSING APPARATUS
Filed March 25, 1968  12 Sheets-Sheet 11

INVENTORS:
ROLLIN E. CAMPBELL,
HARRY D. FORSE,
BY Hood, Gust + Irish
ATTORNEYS.

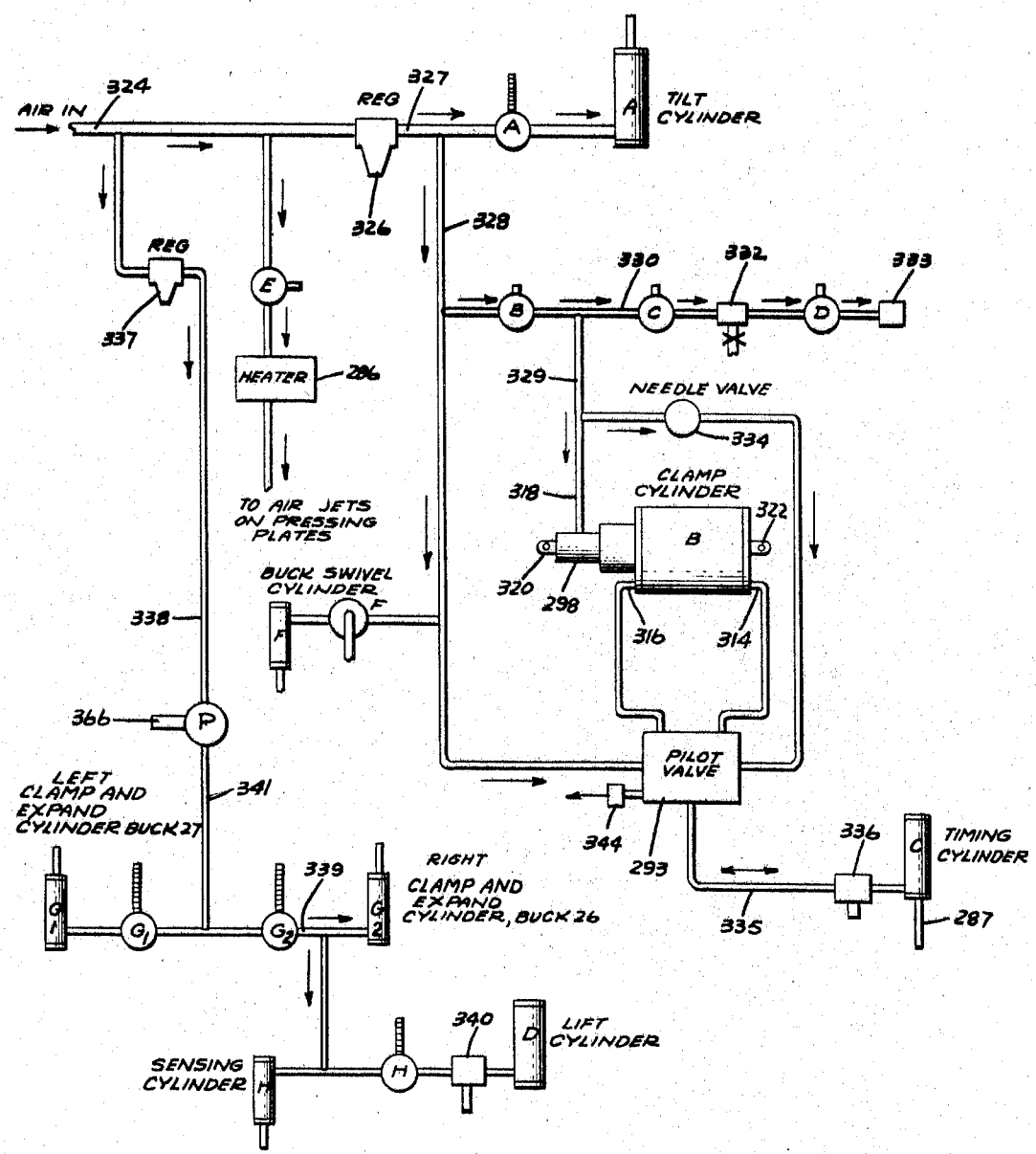

United States Patent Office 3,484,821
Patented Dec. 16, 1969

3,484,821
SLEEVE PRESSING APPARATUS
Rollin E. Campbell, Anderson, Ind., and Harry D. Forse, 220 Woods Road, Edgewood Addition, Anderson, Ind. 46011; said Campbell assignor to said Forse, Anderson, Ind.
Filed Mar. 25, 1968, Ser. No. 715,854
Int. Cl. D06c 15/00
U.S. Cl. 223—73          45 Claims

ABSTRACT OF THE DISCLOSURE

Apparatus for pressing the sleeves of a garment having a pair of upright bucks for receiving the sleeves with the body portion of the garment hanging downwardly therefrom, a first fluid-actuated cylinder for moving the bucks upwardly from a lower position to selective upper positions, a pair of pressing heads for each buck, a second fluid-actuated cylinder for moving the pressing heads transversely between an open position for receiving the respective buck therebetween and a closed pressing position, a third fluid-actuated cylinder for moving the bucks between a dressing position and a pressing position with each buck positioned between and in cooperative relationship with a pair of pressing heads, and a sensing element initially positioned between the outer surface of one of the bucks and the inner surface of the respective sleeve thereon when the bucks are in their lower position, the sensing element automatically detecting upward movement of the junction between the sleeve and the body portion of the garment to a predetermined elevation and deactuating the first cylinder in response thereto thereby to terminate the upward movement of the bucks so that only that portion of the bucks having the sleeves thereon is positioned between the pressing heads.

BACKGROUND OF THE INVENTION

Field of the invention

This invention relates generally to sleeve pressing apparatus, and more particularly to sleeve pressing apparatus which automatically positions the bucks so that only that portion of the bucks having the sleeves thereon is positioned between the pressing heads.

Description of the prior art

Sleeve pressing apparatus has been provided, such as that shown in Patent Nos. 2,420,818 to Davis, 2,687,241 to Maxwell et al., and Re. 23,881 to McLagan, in which a pair of upright bucks are provided for receiving the sleeves of a garment, the bucks being moved from a dressing position to a pressing position between respective pairs of pressing heads. Both the Davis and McLagan patents recognize the fact that the junction or shoulder seam between the sleeve and body portion for sleeves of different size and length will be positioned on the buck at different elevations and thus, that it is necessary to adjust the pressing position of the bucks so that only that portion of bucks having the sleeves thereon is positioned between the pressing heads. In the Davis patent, that adjustment was accomplished manually. In the McLagan patent elevation of the shoulder seam was measured by the operator by means of a separately mounted lever connected by linkage to a servo system which provided a corresponding upward movement of the bucks. In each of the above-referred to patents, the bucks were rigidly mounted upon support means, no movement to equalize pressing pressure or to facilitate dressing the shirt upon the bucks being provided.

It is increasingly desirable to utilize unskilled labor in commercial laundries thus dictating that operations requiring experience and skill, such as determining the proper elevation of bucks with the sleeves thereon, be eliminated. Therefore it is desirable to provide sleeve pressing apparatus in which the bucks are automatically moved upwardly to the proper elevation to the end that the operator need only dress the sleeves upon the buck with all other operations being automatically performed in proper sequence.

SUMMARY OF THE INVENTION

This invention, in its broader aspects, provides sleeve pressing apparatus having a buck assembly including a pair of elongated, tapered, transversely spaced-apart, upstanding bucks for respectively receiving the sleeves of a garment with the body portion thereof hanging downwardly therefrom. First, power means is provided for upwardly moving the bucks in the direction of elongation thereof between a lower position and selective upper positions. A pair of pressing heads is provided for each of the bucks respectively formed to conform thereto and, second power means is provided for transversely moving the pairs of pressing heads between an open position for receiving the respective bucks therebetween and a closed pressing position. Third power means is provided for moving the buck assembly between an initial dressing position and a pressing position with each buck positioned between and in cooperative relationship with a pair of pressing heads. Means are provided for actuating the first power means thereby to initiate the upper movement of the bucks. Means are provided cooperating with a sleeve on one of the bucks for sensing upward movement of the bucks to a position in which the junction of the sleeve and the body portion of the garment, i.e. the shoulder seam, is at a predetermined elevation, and means are provided coupling the first power means and the sensing means and operable thereby to deactuate the first power means thereby terminating the upward movement of the bucks at the said position thereof.

It is accordingly an object of the invention to provide improved sleeve pressing apparatus.

Another object of the invention is to provide improved sleeve pressing apparatus wherein the bucks are automatically moved upwardly to a position in which only that portion thereof having sleeves thereon is positioned between the pressing heads.

The above-mentioned and other features and objects of this invention and the manner of attaining them will become more apparent and the invention itself will be best understood by reference to the following description of an embodiment of the invention taken in conjunction with the accompanying drawings, wherein:

Brief description of the drawings

FIG. 1 is a side elevational view, partly in cross-section, illustrating the improved sleeve pressing apparatus of the invention;

FIG. 2 is a cross-sectional view taken along the line 2—2 of FIG. 1;

FIG. 3 is a rear end view of the apparatus as viewed along the line 3—3 of FIG. 1;

FIG. 4 is a fragmentary schematic view in perspective showing the buck mounting structure;

FIG. 5 is a cross-sectional view taken along the line 5—5 of FIG. 4;

FIG. 6 is a fragmentary view showing the actuating mechanism for the expanders;

FIG. 7 is a fragmentary side view, partly broken away, showing the expanders;

FIG. 7a is a detail, in cross-section, taken along the line 7a—7a of FIG. 7;

FIG. 8 is a fragmentary cross-sectional view taken along the line 8—8 of FIG. 7;

FIG. 9 is an enlarged fragmentary cross-sectional view showing the details of the upper extremity of each buck, taken generally along the line 9—9 of FIG. 8;

FIG. 10 is a fragmentary view in perspective, partly broken away, showing the sensing mechanism of the invention;

FIGS. 11 and 12 are fragmentary schematic views illustrating the mode of operation of the sensing mechanism of the invention;

FIG. 13 is a fragmentary view in perspective, partly broken away, illustrating the control mechanism;

FIG. 16 is a schematic view showing the pneumatic system; and

DESCRIPTION OF THE PREFERRED EMBODIMENT

Figure 17A:
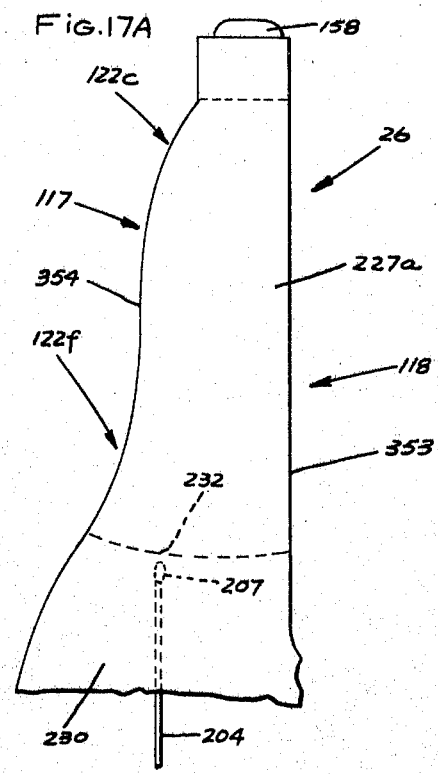
FIGS. 17a and 17b are schematic views illustrating the mode of operation of the expanders with different type sleeves.

Referring now to FIGS. 1, 2 and 3 of the drawings, the improved sleeve pressing apparatus of the invention, generally indicated at 20, comprises a frame 21 having a base portion 22 and transversely spaced-apart side portions 23 and 24. Buck assembly 25 comprises upstanding, elongated, tapered bucks 26 and 27, only one of which is shown in FIG. 1. Each buck is mounted on a support assembly 28, the two support assemblies 28 in turn being connected to piston rod 29 of a conventional fluid power cylinder D, referred to as the "lift" cylinder.

The buck assembly 25 including the bucks 26, 27 and their respective support assemblies 28 are movable vertically in the direction of elongation of the bucks 26 and 27 between a lower dressing position, as shown in FIG. 1, and selective upper positions, as shown in dashed lines at 30 in FIG. 1.

Two pairs of pressing heads 32 and 33 are provided, the pair 32 comprising a movable pressing head 34 and common fixed head 35, and the pair 33 comprising movable pressing head 36 and the common fixed head 35. The heads 34, 35 and 36 have suitable recesses 37 formed in the cooperating surfaces to accommodate and conform to the bucks 26 and 27.

The common fixed head 35 is connected by a bracket assembly 38 to a top transverse member 39 which extends between the side frame portions 23 and 24. The movable heads 34 and 36 are respectively connected by mounting assemblies 40 and 42 to the upper ends 43 and 44 of lever members 45 and 46. Lever members 45 and 46 are pivotally connected intermediate their ends to transverse frame member 47. The lower ends 50 and 52 of the lever members 45 and 46 are respectively connected to fluid power cylinder B, to be hereinafter more fully described, referred to as the "clamp" cylinder.

FIG. 2 shows the pairs of pressing heads 32 and 33 in their open positions for receiving the bucks 26 and 27 therebetween, while FIG. 3 shows the pairs of heads in their closed positions. A coil spring 53 is connected between the lower portions of the lever members 45 and 46 below the pivot points 48 and 49 so that the movable heads 34 and 36 are normally urged to their open positions. Actuation of the clamp cylinder B pivots the upper ends 43 and 44 of the lever members 45 and 46 in the direction shown by the arrow 41 thereby to close the movable heads 34 and 36 to their closed, pressing positions.

Buck assembly 25 is moved, as shown by the dashed line 54, from its dressing location, as shown in FIG. 1, to its pressing location, with the bucks 26 and 27 respectively positioned between the pairs of pressing heads 32 and 33, by a lever member 55 having its forward end 56 connected to the lift cylinder D and its rear end 57 connected to a transverse member 58 pivotally connected to the base portion 22 of frame 21. Lever member 55 may then be pivotally moved in the direction shown by the arrow 59 from its position shown in solid lines in FIG. 1 to the position shown by the dashed lines 60.

Another lever member 63 is provided having an end 64 pivotally connected by a bracket 65 to the transverse frame member 47. A link 66 connects lever member 55 and lever member 63. A conventional fluid power cylinder A, referred to as the "tilt" cylinder is provided connected to the transverse member 31 of base portion 22 of frame 21, and having its piston rod 69 connected to lever member 63. A conventional snubbing mechanism 67 is mounted on transverse member 31 and is connected to the lever 63 by a link 68.

It will readily be seen that the pressing heads 32 and 33 and the buck assembly 25 are relatively disposed, and that the lever member 55 is of such length that the weight of the buck assembly 25 will normally bias the same downwardly to its dressing position, as shown in FIG. 1. Actuation of the tilt cylinder A resulting in upward movement of its piston rod 69 in the direction shown by the arrow 70 results in upward pivotal movement of the lever member 63, as shown by the dashed lines 72, in turn resulting in the aforesaid upward pivotal movement of the buck assembly 25 to its pressing position. A suitable spring 73 is connected between a bracket assembly 74 mounted on the transverse frame member 39 and the lever member 63 and serves to assist the tilt cylinder A in providing the upward pivotal movement of the buck assembly 25.

It will be readily understood that the pressing heads 34, 35 and 36 are heated in conventional fashion, as by steam from a source (not shown) coupled to fittings 75.

Referring now to FIGS. 4 and 5, the support assemblies 28 for mounting the bucks 26 and 27 upon the piston rod 29 of the lift cylinder D will be more fully described. End 56 of lever member number 55 is connected to the lift cylinder D by means of an L-shaped bracket member 76 having an upper leg 77 with an aperture therein through which the piston rod 29 extends. A generally T-shaped member 78 is rigidly connected to the upper end 79 of the piston rod 29. A guide bar 80 is connected to the outer end of the leg 82 of a member 78 and extends downwardly therefrom. Leg 77 of the bracket 76 has a slot 83 formed therein which slidably receives the guide bar 80 thus preventing the guide bar and the member 78 from turning. A generally Y-shaped member 84 is secured to the guide bar 80 extending rearwardly therefrom and spaced downwardly from the leg 82 of member 78. Legs 85 and 86 of the member 84 have their extremities in vertically spaced alignment with the extremities of the bar portion 87, 88 of member 78. A pair of pivot members 89, 90 extend between the legs 85, 86 of member 84 and the extremities at the bar portion 87, 88 of member 78, being pivotally connected thereto for providing the force of pivotal motion of bucks 26 and 27.

Each of the buck supports 28 comprises a generally U-shaped frame having an upper connecting member 93 and leg members 94 and 95 extending therefrom. A horizontally extending bar 96 is centrally rigidly secured to each of the pivot members 89, 90, so as to pivot therewith. A pair of links 97, 98 are respectively pivotally connected at their upper ends to each of the bars 96 and respectively pivotally connected adjacent their lower ends to the lower extremities 99 of the leg members 94 and 95 of the U-shaped frame 28. A bar 100 is connected to and extends between the lower ends of links 97 and 98.

It will now be seen that the mounting of the supports 28 on the members 78 and 84 by means of the pivot members 89 and 90 provides for pivotal motion of the supports 28 and the bucks 26 and 27 between a position facing divergently outwardly in direction 102 facing away from the pressing heads 32 and 33, as shown in dashed lines 94a and 95a in FIG. 5, to a position in which the supports 28 and bucks 26 and 27 are generally parallel, as shown in solid lines. It will further be seen that the mounting of the supports 28 by means of the links 97 and 98 provides a further compound motion or "double-jointed" connection of the bucks, the first motion being a pivotal motion abut pivot points 103 with the supports 28 and bucks 26 and 27 thus having free pivotal movement between a divergently upwardly facing position and a generally parallel position, as shown by the arrow 104, and a further free motion toward and away from each other, as shown by the arrows 105. It will be readily understood that the bucks are padded, as at 101a (FIG. 7) and it will further be observed that the central pressing head 35 is stationary whereas the other two heads 34 and 36 are respectively moveable. When the bucks are initially positioned between the pressing heads, they are generally parallel, however, when the moveable heads 34 and 36 are actuated to their pressing positions, the padding 101 is compressed and there is thus a tendency for each buck to move laterally toward the central head 35. In the absence of the double jointed connection of the bucks, above-described, this lateral movement is provided by mere deflection of the bucks thus resulting in unequal pressing pressure. However, the compound motion or double jointed connection of the bucks accommodates this tendency for lateral motion within the pressing heads and thus provides equal pressing pressure.

Stops 106 respectively secured to the support legs 94 and engageable with the pivot posts 89 and 90 limit the outward pivotal movement of the supports 28 and bucks 26, 27. Springs 107 respectively connected between the guide 80 and the legs 94 normally bias the supports 28 and bucks 26 and 27 to their divergently outwardly, forwardly facing positions shown in FIG. 5. A conventional fluid-actuated cylinder F referred to as the "swivel" cylinder acts upon the stops 106 and when actuated pivots or swivels the supports 28 and bucks 26 and 27 to their parallel positions. Stops 108 are rigidly secured to the members 96 and depend therefrom, stops 108 cooperating with stop member 109 on the leg 77 of bracket 76 for limiting the inward pivotal motion of the supports 28.

Referring now to FIGS. 6, 7, 8 and 9, each of the bucks 26, 27 comprises a central, elongated, upwardly extending heating element 110 having a central passageway 112 therein. Heating element 110 is heated in a conventional fashion, as by steam from a source (not shown) connected to conventional fittings 113. The lower end 114 of the heating element 110 is rigidly secured to plate members 115, 116 which, in turn, are rigidly secured to the top member 93 of the support 28. Padding 101 comprises two separate padding elements 101a and 101b respectively covering the opposite surfaces of the heating element 110 and extending outwardly from the opposite sides thereof to define recesses in which the expanders 117 and 118 are accommodated when in their retracted positions. Padding elements 101a and 101b are removably secured to the heating element 110 in conventional fashion, as by a spring 131 at their lower ends and studs 111 at their upper ends (FIG. 8).

Expander 117 comprises an elongated rigid element 119 having lower and upper ends 120 and 121, and a flexible element 122 which defines the outer perimetral boundary thereof. Element 122 has its bottom end 122a rigidly secured to lower end 120 of element 119 and has a pair of spring loops 123 formed in its rigid bottom portion 122b. Flexible element 122 has a reverse bend 122c formed at its upper end and another reverse bend 122d formed adjacent its top end, bend 122d being slidably received in a slot 124 in a guide member 125 secured to rigid element 119 adjacent its upper end 121.

A rigid spacer 126 interconnects rigid element 119 and the upper side portion 122c of flexible element 122. A moveable rod 127 is connected to the lower side portion 122f of the flexible element 122 and extends loosely through an opening in rigid element 119. Rod 127 has inner and outer stops 127a and 127b thereon on either side of the rigid element 119. Expander 117 is partially covered with a sleeve 128 of flexible padding material open at its inner side 128a to accommodate movement of flexible element 122.

With the provision of the moveable rod 127, the lower side portion 122f of the flexible element 122 may flex inwardly to the position shown in dashed lines at 122g to accommodate short sleeves, and also to accommodate long sleeved shirts of various shapes and sizes from the elbow to the shoulder, the spring loops 123 also accommodating this flexing of portion 122f. The upper bend 122c may also flex inwardly, as shown by the dashed lines 122h, thereby to accommodate long sleeved shirts of various sizes and shapes in the placket area just below the cuff. Rigid spacer 126 establishes the extent of actual movement of expander 117, the upper and lower portions 122c and 122f independently flexing accordingly.

The other expander 118 comprises an elongated rigid element 342 having lower and upper ends 343 and 344, and an elongated rigid element 345 which defines the outer perimetral boundary thereof. Element 345 has its lower end 346 connected to lower end 343 of element 342. Element 345 has a reverse bend 347 at its upper end and is attached at end 348 to the upper end 344 of element 342. Rigid spacers 349 and 350 interconnect elements 342 and 345, as shown. Expander 118 is covered with flexible padding material 352.

Expanders 117 and 118 are selectively moved between their retracted and protracted positions by the arrangement now to be described. A pair of lever members 129, 130 are provided having their lower ends 132, 133 pivotally connected to the side legs 94 and 95 of the support 28 adjacent their lower extremities 99, as at 134. The upper ends 135, 136 of the pivoted lever members 129, 130 are respectively coupled by links 137, 138 to the lower ends 120 and 343 of the rigid elements 119 and 342 of the expanders 117, 118, links 137, 138 in the retracted positions of the expanders 117, 118 being received within recesses or grooves 139 formed in the plate members 115, 116, as best seen in FIG. 7. It will now be seen that pivotal movement of the lever members 129, 130 between their positions shown in solid lines in FIG. 6 to their positions shown in dashed lines at 129a and 130a will respectively move the lower ends 120 and 343 of the rigid elements 119 and 342 (and thus the lower ends of the expanders 117 and 118) from their retracted positions adjacent the sides of heating element 110, to their protracted positions, as shown in FIG. 7.

The upper ends 121 and 344 of the rigid elements 119 and 342 are respectively coupled by clips 140, 142 to ends 143, 144 of lever members 145, 146 which are pivoted intermediate their ends to plate members 147, 148 respectively attached to the upper end 149 of heating element 110. The other ends 150, 152 of lever members 145 and 146 are respectively connected to the upper ends 153, 154 of actuating rod elements 155, 156 which extend downwardly through the central opening 112 in the heating element 110, as best seen in FIG. 9. It will now be seen that downward movement of the actuating rods 155, 156 in the direction shown by the arrows 157 will result in pivoting the lever members 145 and 146 thereby to move their ends 143 and 144, and the upper ends 121 and 344 of the rigid elements 119 and 342 of the expanders 117, 118 outwardly from their retracted positions, to their expanded or protracted positions, as shown in FIG. 7. It will now be seen that the lower and upper ends of the expanders 117, 118 are independently actuated between their retracted and expanded positions, the lower ends being actuated between the retracted and protracted positions by means of the pivoted lever members 129 and 130, and the upper ends likewise being moved between their retracted and protracted ends by lever members 145 and 146 and, in turn, by the actuating rods 155 and 156.

Referring now to particularly FIGS. 8 and 9, in order to actuate the expanders 117, 118 of each of the bucks 26 and 27, and also to actuate the lift cylinder D, as will be hereinafter more fully described, each of the bucks 26 and 27 has a manually actuated cap member 158 at its upper end. The manually actuated cap member 158 comprises a suitable molded cover 159 secured to a lever member 160 by a suitable threaded fastener 162. Lever member 160 is transversely disposed between the two plate members 147, 148 and is pivotally connected thereto by means of a suitable hinge 163. A suitable T-shaped clamp 164 is provided for clamping the cuff portion of the shirt to the buck, clamp 164 being connected to the lever member 160 by a bar 165. Lever member 160 with the cap 159 thereon is selectively manually moveable between a deactuated position, as shown in solid lines in FIG. 8, in which the clamp 164 is disengaged from the cuff of a shirt, to an actuated position, as shown in dashed lines in FIG. 8, in which the clamp 164 will be in full engagement with the cuff portion of the shirt.

Another actuating rod 166 is provided connected to the lever member 160 intermediate the hinge 163 and the clamp rod 165, actuating rod 166 extending downwardly through the opening 112 in the heating element 110 in spaced parallel relationship with the actuating rods 155, 156. It will be readily apparent that manual actuation of the cap member 158 from its deactuated position to its actuated position in the direction shown by the arrow 167 in FIG. 8 will result in downward movement of the actuating rod 166 in the direction shown by the arrow 168 in FIG. 9.

Referring now particualrly to FIG. 6, actuating rods 155 and 156 for the lever members 145 and 146, and the actuating rod 166 from the manually-actuated cap 158 extend downwardly through the central opening 112 in the heating element 110, downwardly between the plate members 115 and 116, and downwardly through an opening 169 in the top member 93 of the support 28. The lower extremity 170 of the actuating rod 166 is coupled to one end 171 of lever member 172 which is pivotally mounted, as at 173, to selectively actuable valve G. Valve G is mounted on the side leg 94 of support 28 by a suitable bracket 174. Lever member 172 has a leg 175 extending downwardly therefrom and connected to the spring actuating member 176 for the valve G. Lever member 175 is normally biased to its de-actuated position by means of a suitable spring 177 coupled between the leg 175 of lever member 172 and the other leg 95 of support 28.

The other end of lever member 172 is coupled by a link 179 to another lever member 180. One end of 182 of lever member 180 is coupled by an equalizing link 183 to the bottom ends 184 and 185 of actuating rods 155, 156. The other end 186 of lever member 180 is coupled to piston rod 187 of conventional fluid-actuated cylinder G, referred to as the "clamp and expand" cylinder.

The other side of the clamp and expand cylinder G is connected to one end 188 of lever member 189 which is pivotally connected, as at 190 to a bracket 192 connected to leg 94 of support 28. The other end 193 of lever member 189 is connected by a link 194 to an equalizing link 195. The opposite ends 196 and 197 of the equalizing link 195 are coupled by links 198 and 199 to the ends of members 200 and 201 which are rigidly connected to the lever members 130, 129 adjacent their pivot points, as shown. Lever members 129, 130 are normally biased to their retracted positions by means of suitable springs 203, as shown.

It will now be seen that manual actuation of the cap member 158 from its position shown in solid lines in FIG. 8 to its clamping and actuating position as shown in dashed lines in that figure so as to clamp the cuff portions of the sleeves, will result in downward movement of the actuating rod 166 in the direction shown by the arrow 168, thereby actuating lever member 172 to its position shown in dashed lines 172a, and moving leg portion 175 thereof to its position shown in dashed lines at 175a, thereby actuating the actuating member 176 and in turn actuating valve G so as to actuate the clamp and expand cylinder G. Clamp and expand cylinder G is free floating, i.e. neither end is rigidly connected, and thus upon initial actuation, piston rod 187 will move upwardly thereby to pivot lever member 180 to its position shown in dashed lines at 180a thereby moving the equalizing link 183 and the actuating rods 155, 156 downwardly in the direction as shown by the arrows 157, in turn actuating lever members 145 and 146 to move the upper ends of the expanders 117, 118 toward their protracted positions. When the lever members 145 and 146 have been thus pivoted to move the upper ends of the expanders 117 and 118 toward their protracted positions, further downward movement of the actuating rods 155 and 156 will be prohibited thus causing the connection 204 between the lever member 180 and the equalizing link 183 to become the pivot point. At this point, a further incremental upward movement of the piston rod 187 of the clamp and expand cylinder G will actuate link 179 upwardly thereby to pivot end 171 of lever member 172 downwardly a further incremental amount thus moving actuating rod 166 further dowwardly so as to tightly clamp the clamp 164 against the cuff of the sleeve. When no further downward movement of actuating rod 166 is possible, continued actuation of the clamp and expand cylinder G will result in downward movement of the cylinder itself, as shown by the arrow 205 thus pivoting end 188 of the lever member 189 downwardly and pivoting the end 193 upwardly, as shown by the dashed lines 193a, in turn moving link 194 and the equalizing link 195 upwardly, and further in turn moving the upper ends of the members 200 and 201 upwardly so as to pivot lever members 129 and 130 outwardly toward their positions shown in dashed lines 129a and 130a. As previously indicated, movement of lever members 129 and 130 toward their outwardly pivoted positions 129a and 130a results in outward movement of the lower ends of the expanders 117 and 118 from their retracted toward their protracted positions.

It will now be seen that the provision of the flexible element 122 which defines the perimetral edge of the expanders 117, 118, the independent actuation of the upper and lower ends of the expanders from their retracted toward their protracted positions by means of the lever members 145, 146, and 129, 130 and the equalizer links 183 and 195 permit the expanders to accommodate themselves to a wide variety of shapes and sizes of sleeves, both long and short, thereby to provide a better and more equal expansion of all configurations of sleeves.

Figure 17B:
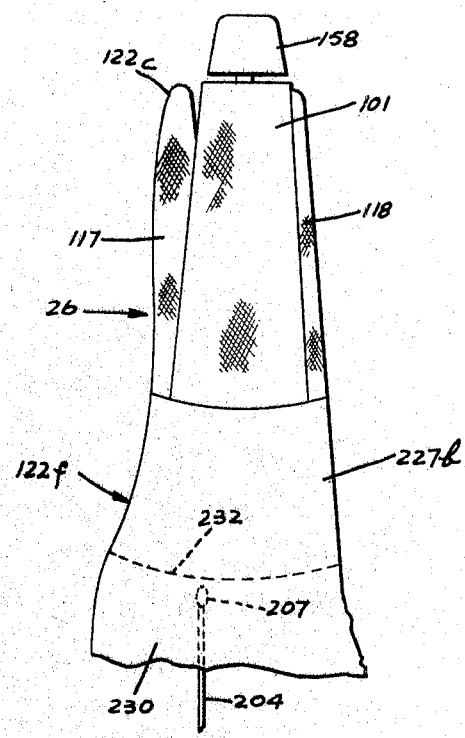

Referring more particularly to FIG. 17a, there is shown a sleeve 227a of a long-sleeved shirt positioned on buck 26. It will be seen that the top edge 353 of the sleeve is maintained substantially straight by the rigid expander 118, while the flexible expander 117 conforms to the shape of the bottom edge 354, both expanders cooperating to maintain the sleeve taut on the buck. Referring to FIG. 17b, there is shown a sleeve 227b of a short-sleeved shirt positioned on the buck 26. Here, the conformance of the flexible expander 117 to the shape of the sleeve, together with the unequal outward movement of the upper ends of the expanders 117 and 118, which is accommodated by equalizer link 183 (FIG. 6) is clearly seen.

It will be understood that the clamp 164 engages and holds together the split in the cuff portion of the shirt, i.e. it holds the edges of the shirt in edge-to-edge relation as determined by the operator. It will also be observed that with the clamp 164 and the upper ends 121 and 344 of the expanders 117 and 118 interconnected by rod 166, lever 172 and link 179 on the one hand, and rods 156 and 155, link 183 and lever 180 on the other, force applied to the upper ends of the expanders tending to separate the split results in the application of further force on the clamp to hold the split more securely. It will further be seen that the linkage 172, 179, 180 provides a lost motion connection so that when the upper ends of the expanders have moved outwardly until restrained, further expansive force will result in the application of still further clamping force.

Referring now to FIGS. 1, 10, 11 and 12, there will be described the mechanism for automatically sensing the upward movement of the shoulder seam of the sleeve to a predetermined elevation and for terminating the upward movement of the bucks 26 and 27 in response thereto. An elongated sensing element in the form of a relatively rigid rod 204 is provided having its lower end 205 pivotally connected to a bracket member 206 secured to the bottom end of the lift cylinder D and having a small knob 207 at its upper end. Rod 204 is a predetermined length and the knob 207 at its distal end is thus at a predetermined elevation above the base portion 22 of the frame 21. The upper portion of sensing rod 204 extends upwardly in close proximity to one of the bucks, i.e. buck 26.

An operating member in the form of an elongated rod 208 is provided having a loop 209 attached to its upper end 210, loop 209 slidably receiving the sensing rod 204. A right-angle end 212 is formed at the lower end of rod 208 and laterally projecting portion 213 is rigidly secured to a clevis 214. Clevis 214 is pivotally connected to member 215 which, in turn, is rigidly connected to side leg 95 of support 28, by a bracket 216. Operating member 208 and, in turn, sensing rod 204 are thus adapted to be pivotally moved from an upright position, as shown in solid lines in FIG .10, in which the upper portion of rod 204 is generally parallel with and closely adjacent the outer surface of buck 26, laterally away from buck 26, as shown by the dashed lines 204a. Operating rod 208 has a projection 217 thereon connected to actuate the spring-actuator 218 of valve H which is mounted on side leg 25 of support 28 by means of a bracket 219. As will be hereinafter described, valve H is coupled in the actuating system of the lift cylinder D and serves, when actuated, to terminate actuation of the lift cylinder D and thus the upward movement of the bucks 26 and 27.

Clevis 214 has a projection 220 depending therefrom. A conventional fluid-actuated cylinder H, referred to as the "sensing" cylinder, is connected between projection 220 and the bracket 222 mounted on the side leg 95 of the support 28. Sensing cylinder H, when actuated, serves to urge or bias operating rod 208 and, in turn, the sensing rod 204 outwardly away from buck 26 as shown by the arrows 223 and 224, sensing cylinder H urging projection 220 of the clevis 214 pivotally as shown by the arrow 225.

Referring now to FIG. 11 in which the bucks 26 and 27 are shown in their lower, dressing position, the knob 207 and the upper portion of sensing rod 204 are normally positioned closely adjacent the outer surface 226 of buck 26. In operation, sleeves 227 and 228 of a shirt are dressed downwardly over the upstanding bucks 26 and 27 with the body portion 229 of the shirt hanging downwardly from the sleeves. It will thus be seen that the dressing position of the buck assembly, the knob 207 and the upper portion of the sensing rod 204 is positioned between the outer surface 226 of buck 26 and the inner surface of the sleeve 227. As will be hereinafter more fully described in conjunction with FIG. 16, actuation of the cap 158 associated with buck 27 actuates the valve G and the clamp and expand cylinder G, respectively associated with buck 27, thereby to actuate the expanders 117 and 118 associated with buck 27, thereby to expand sleeve 228. Actuation of the cap 158 associated with buck 26 not only actuates valve G and the clamp and expand cylinder G associated with buck 26 thereby to actuate expanders 117 and 118 associated with that buck, but also actuates sensing cylinder H thereby causing the cylinder H to urge projection 220 of clevis 214 in the direction shown by the arrow 225, in turn urging or biasing operating rod 208 and sensing rod 204 laterally outwardly away from buck 26 in the direction shown by the arrow 224. However, lateral movement of sensing rod 204 and operating rod 208 in direction 224 sufficient to actuate valve H is at this point precluded by engagement of knob 207 of sensing rod 204 with the inner surface of the expanded and thus taught sleeve 227. Actuation of the cap 158 associated with buck 26 likewise actuated the lift cylinder D causing its piston rod 29 to commence upward movement of the bucks 26 and 27, in the direction shown by the arrow 229, as above described.

Referring particularly to FIG. 12, as the upward movement of the bucks 26 and 27 continues in the direction 229, when the knob 207 at the distal end of the sensing rod 204 passes the junction or shoulder seam 232 between the sleeve 227 and the body portion 230, the restraint against the lateral outward movement of sensing rod 204 and operating rod 208 is suddenly removed and sensing rod 204 and operating rod 208 will be pivoted laterally outwardly away from the outer surface 226 of buck 227, as shown. This lateral outward movement of sensing rod 204 and operating rod 208 will actuate actuator 218 of valve H which, as will hereinafter be described, is coupled with the lift cylinder D to terminate the actuation thereof, thereby automatically to terminate upward movement of the bucks 26 and 27. FIGS. 17a and 17b show the buck 26 in the same position as that shown in FIG. 12, i.e., with knob 207 of sensing rod 204 just past shoulder seam 232.

It will now be seen that the sensing rod 204 cooperates with the sleeve 227 on the one buck 26 as the buck with the sleeve thereon is moved upwardly by the lift cylinder D, the sensing rod 204 sensing passage of the shoulder seam 232 upwardly past the predetermined elevation determined by the length of the sensing rod 204 and terminating the upward movement of the bucks in response thereto.

It will now be readily seen that the length of the sensing rod 204 is so related to the dimensions and position of the pressing heads 32 and 33 that the position to which the bucks 26 and 27 is moved is such that only that portion of the bucks having the sleeves 227 and 228 thereon is positioned between the pressing heads. Thus, in the case of a garment having small sleeves, the shoulder seam 232 will be positioned a considerable distance up the bucks 26, 27 from the supports 28, and therefore, only a relatively small amount of upward movement of the bucks in the direction 229 will be provided before the shoulder seam 232 reaches the elevation established by the distal end 207 of the sensing rod 204. On the other hand, in the case of relatively large sleeves, the shoulder seam 232 will be located much farther down the bucks 26 and 27 toward the supports 28 and, therefore, a considerably greater amount of upward movement of the bucks 26, 27 in direction 229 will be provided before distal end 207 passes the shoulder seam 232. In the case of any size sleeve, however, the upward movement of the bucks 26, 27 will be to that position at which the distal end or sensing knob 207 of the sensing rod 204 senses upward passage of the shoulder seam 232 past the distal end 207 at which point the upward movement will be terminated, that position being such that only that portion of the bucks having the sleeves thereon will be inserted between the pressing heads. It will be observed that this control of the upward movement of the bucks is completely automatic, the bucks being properly positioned with respect to the pressing heads 32 and 33 automatically for every size sleeve without requiring any decision or operation on the part of the operator of the apparatus.

Figure 13A:
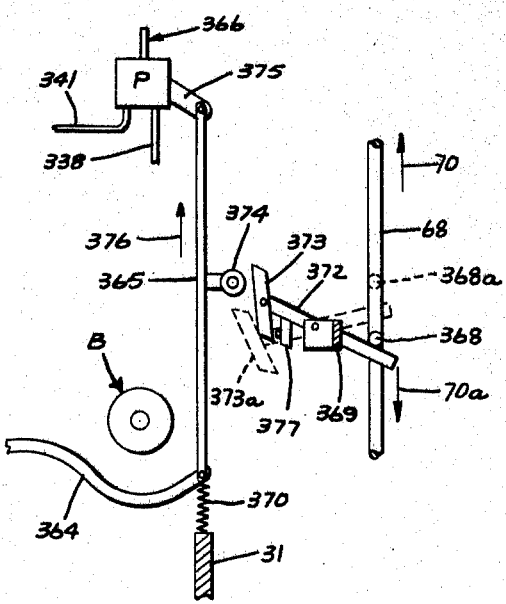
FIG. 13a is a fragmentary view further showing a detail of the control mechanism.
Figure 14:
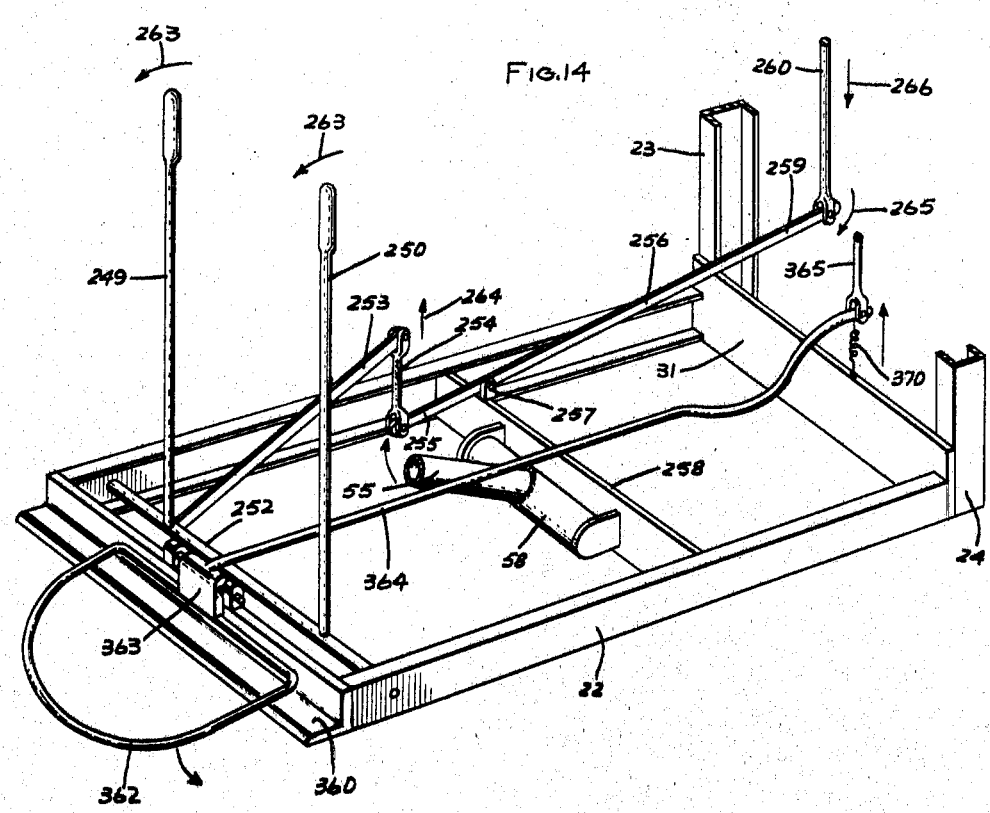
FIG. 14 is a fragmentary view in perspective, partly broken away, further illustrating the control mechanism.

Referring now to FIGS. 13 and 14, an elongated control level 233 is provided pivotally mounted as at 234 adjacent its end 235 to pivot posts 236 which, in turn, are mounted on a bracket member 237. Bracket member 237 is secured to the upright frame member 24 and is further secured in position by means of a brace 238. The outer end 239 of control level 233 has a roller 240 mounted thereon which cooperates with a detent lever 242 having its lower end pivotally connected to upright frame member 23, as at 243. Detent lever 242 has two detent portions 244 and 245 which cooperate with the roller 240. Detent lever 242 is biased to its operative position by means of a suitable spring 246 coupled between transverse frame member 39 and the upper end 247 of the detent lever member.

Control lever 233 is pivoted downwardly in the direction shown by the arrow 248 from its unactuated position with roller 240 in engagement with detent notch 244, as shown in FIG. 13, to its actuated position with the roller 240 in engagement with detent notch 245, by the arrangement now to be described. A pair of manually-actuated lever members 249, 250 are connected to a transverse bar 252 pivotally mounted on base portion 22 of the frame 21. Manually actuated lever members 249, 250, are respectively disposed on either side of the lever member 55 (FIGS. 1 and 14). A lever 253 is rigidly connected to the rod 252 and has its outer end connected by link 254 to one end 255 of lever member 256. Lever member 256 is pivotally mounted intermediate its ends, as at 257, to transverse frame member 258 of the base portion 22 of the frame 21. The other end 259 of lever member 256 is connected by a link 260 to a bracket 262 mounted on control lever member 233 intermediate its pivot point 234 and its outer end 239.

It will now be seen by reference to FIGS. 13 and 14 that manual actuation of the lever members 249 or 250 in the direction shown by the arrows 263 will result in pivotal upward movement of lever member 253 in the direction shown by the arrow 264, in turn resulting in pivotal downward movement of end 259 of lever member 256, as shown by the arrow 265, downward movement of link 260 in the direction shown by the arrow 266, and finally in pivotal downward movement of the control lever member 233 in the direction shown by the arrow 248 thus forcing roller 240 to move from engagement with detent notch 244 to engagement with detent notch 245 against the force exerted by spring 246.

Control lever 233 has a bracket 267 secured thereto which actuates actuating spring 268 of valve A which is mounted on a support bracket 237 by a bracket 269. Valve A is coupled to actuate the tilt cylinder A. Thus, manual actuation of control levers 249, 250 resulting in pivotal downward movement of control lever 233 will result in actuation of valve A and, in turn, actuation of tilt cylinder A to initiate its upward movement in direction 70, thereby to initiate movement of the buck assembly 25 from its dressing position to its pressing position.

A link 270 is pivoted intermediate its ends, as at 272 in a slot 273 formed in control lever 233. End 274 of lever 270 is in vertical alignment with the upper end 275 of snubber link 68 which is connected to the lever member 63. A valve F supported from support bracket 237 by a bracket 276 has an actuating lever 277 biased upwardly by spring 278. A member 279 extending outwardly from lever member 63 normally engages actuating lever 277 of valve F when the tilt cylinder A is in its retracted position (with the buck assembly in its dressing position) thereby deactuating valve F. As piston rod 69 of tilt cylinder A begins its upward movement in direction 70 responsive to actuation of valve A, member 279 will move away from actuating lever 277 of valve F thereby permitting actuation of the same in response to spring 278, in turn actuating the buck swivel cylinder F to pivot the bucks 26 and 27 to their parallel pressing position. Thus, the bucks are pivoted to their pressing position simultaneously with initial tilting movement thereof.

When the piston rod 69 of the tilt cylinder A has moved upwardly in direction 70 to its upper extremity thus positioning the bucks 26 and 27 between the two pairs of pressing heads 34, 35 and 36, end 275 of the link 68 will engage end 274 of lever 270 thus pivoting its other end 280 downwardly in the direction shown by the arrow 282 to actuate valve B mounted on the support bracket 237. Valve B is coupled to actuate clamp cylinder B thus to actuate the lever members 45 and 46 to move the movable pressing heads 34 and 36 into pressing engagement with the bucks 27 and 26 respectively.

A lever member 283 is pivotally mounted on the support bracket 237 and is coupled by a link 284 to the lower end 52 of head-actuating lever member 46. Thus, as the lower end 52 of lever member 46 is pivoted outwardly in the direction shown by the arrow 285 in response to actuation of the clamp cylinder B, lever member 283 is pivoted downwardly in the direction shown by the arrow 285 to actuate valves D and E. Valve E couples the source of air to a suitable heater 286 (FIG. 16) which supplies heated air to jets on the pressing plates for heating the exposed edges of the sleeves in known fashion. As will be hereinafter described valve D closes the exhaust line for the clamp cylinder B.

A conventional fluid actuated cylinder C, referred to as the "timing" cylinder is mounted on frame member 39 extending downwardly therefrom. Timing cylinder C has a clevis 286 at the end of its piston rod 287 which cooperates with a projection 288 formed on the bracket 262. Bracket 262 has a U-shaped portion 289 cooperating with a snubber member 290 mounted on a bracket 292 which, in turn is mounted on the support bracket 237.

As will be hereinafter described, timing cylinder C is normally charged so that its piston rod 287 is fully protracted. As will be hereinafter more fully described, when the pilot valve 293 (FIG. 16) associated with the clamp cylinder B shifts from its "closing" to its "squeezing" position, it starts to bleed air from the timing cylinder C so that its piston rod 287 is retracted in timed fashion in the direction shown by the arrow 294. At the end of its timed retracting stroke, abutment 295 of clevis 286 engages extension 288 of the bracket 262 thereby moving the control lever member 233 upwardly from its actuated position to its deactuated position with roller 240 moving out of engagement with detent notch 245 and into engagement with detent notch 244 against the force exerted by spring 246 on the detent lever member 242.

Movement of the control lever 233 to its deactuated position pivots its end 235 downwardly in the direction shown by the arrow 296 so that end 235 actuates valve C mounted on the supporter bracket 237. As will be hereinafter described, valve C commonly referred to as the "exhaust" valve, serves to exhaust air from the clamp cylinder B. Movement of control lever 233 to its deactuated position deactuates valve B thereby removing the clamp air from the small cylinder 298 of clamp cylinder B and causing actuation of pilot valve 293 to permit repressurization of large cylinder 304 of cylinder B, thereby moving lever members 45 and 46 to open the moveable pressing heads 34 and 36. Movement of the lower end 52 of lever member 46 in the opposite direction thereby to open pressing head 36 pivots lever member 283 upwardly to deactuate the valves D and E. Movement of the control lever 233 to its deactuated position also deactuates valve A thereby to deactuate the tilt cylinder A to initiate return of the buck assembly 25 from its pressing position to its dressing position.

Referring to FIGS. 13, 13a and 14, a clamp and expand tripping pedal 362 is pivotally mounted on front transverse frame member 360, as at 363, and has an actuating lever 364 connected thereto and extending rearwardly therefrom. Pedal valve P is mounted on bracket 276 and has its actuating lever 375 connected to lever 364 by rod 365. A spring 370 normally biases lever 344, rod 365, and actuating lever 375 downwardly so as to maintain valve P in a normally open position.

A tripping lever 372 is pivotally mounted on a bracket 369 attached to side frame member 24. A tripping cam 373 is pivotally mounted on one end of lever 372 and cooperates with roller 374 on rod 365. A pin 368 extends outwardly from snubber rod 68 and normally holds lever 372 and cam 373 in the position shown in FIG. 13a when the apparatus is in its at-rest position, i.e. with the buck assembly 25 at its dressing location.

When the snubber rod 68 moves upwardly in the direction shown by the arrow 70 as the buck assembly 25 is pivoted to its pressing location, as above described, pin 368 moves upwardly permitting lever 372 and cam 373 to pivot downwardly to the position shown at 373a in FIG. 13a, cam 373 being pivoted to pass roller 374. In its position shown at 373a, cam 373 is in its actuating position under roller 374.

When the snubber rod 68 moves downwardly, as shown by the arrow 70a, responsive to pivotal return movement of the buck assembly from its pressing location back to its dressing location, pin 368 engages lever 372 thereby pivoting cam 373 upwardly to engage roller 374 thereby to move rod 365 upwardly in the direction shown by the arrow 376 to actuate pedal valve P to its exhaust position. As the downward movement of snubber rod continues, the end of the cam 373 will roll off of the roller 374 so that lever 372 and cam 373 resume their position shown in solid lines in FIG. 13a and spring 370 will then return rod 365 and pedal valve P to the normally open position. A stop 377 on lever 372 cooperates with cam 373 to hold it in its actuating position while engaging roller 374. It will be readily seen that cam 373 pivots away from stop 377 during the downward pivotal movement of lever 372 to permit cam 373 to pass roller 374.

Figure 15:
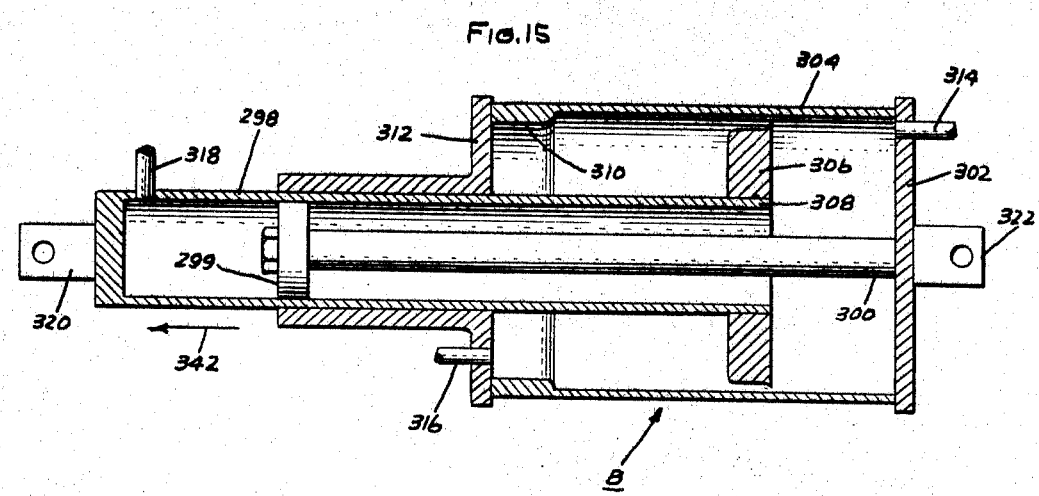
FIG. 15 is a cross-sectional view of the clamp cylinder.

Referring now to FIG. 15, in the preferred embodiment of the invention, clamp cylinder B is pneumatically actuated and is of the double-piston type, similar to that described and illustrated in Patent No. 2,458,976 of the present applicant Campbell. Here, piston rod 298 is hollow, forming a cylinder having a piston 299 moving therein and mounted on a piston rod 300 which is secured to the rear end wall 302 of the large cylinder 304. Another piston 306 is secured to the inner end 308 of the hollow piston rod 298. The larger piston 306 normally has a clearance with the inner wall of the larger cylinder 304, but forms a sealing relationship with a reduced wall portion 310 at the forward end wall 312 of the large cylinder 304 for a purpose shortly to be described. An inlet conduit 314 communicates with the larger diameter section of the large cylinder 304 and another conduit 316 communicates with the smaller diameter section defined by the wall portion 310. Another inlet conduit 318 communicates with the interior of the hollow piston rod 298. It will be readily understood that the lower ends 50 and 52 of the lever members 45 and 46 are respectively coupled to end 320 of the hollow piston rod 298 and end 322 of the end wall 302.

Referring now to FIG. 16, an inlet air line 324 is provided adaptably coupled to a suitable source of air under pressure (not shown). Inlet air line 324 is coupled to a conventional regulator 326 which reduces the inlet air pressure to a suitable pressure, such as approximately 80 p.s.i. Line 327 from the regulator 326 is coupled by valve A to the tilt cylinder A. Line 327 is also coupled by line 328, valve B and line 329 to the inlet conduit 318 of the clamp cylinder B which communicates with the hollow piston rod 298. Line 330 also couples valve B to valve C which in turn is coupled by a conventional bleeder valve 332 to valve D, which finally is coupled to a suitable muffler 333. Line 328 from the regulator 326 is also coupled by a valve F to the buck swivel cylinder F. Finally, line 328 is coupled to one side of a conventional pilot valve 293. Line 329 from valve B is also coupled by a conventional needle valve 334 to the pilot valve 293. Inlet conduits 314 and 316 of the clamp cylinder B are likewise coupled to the pilot valve. Timing cylinder C is charged through the pilot valve 293 by line 335 and metering check valve 336.

Inlet line 324 is coupled to another conventional regulator 337 which reduces the inlet air pressure to a suitable pressure such as approximately 50 to 60 p.s.i. Line 338 from the regulator 337 is coupled by pedal valve P, line 341 and valve G, associated with buck 27 to the clamp and expand cylinder $G_1$ of buck 27. Line 341 is also coupled by the valve $G_2$ of the buck 26 to the clamp and expand cylinder G of buck 26. Line 339 from the valve $G_2$ associated with buck 26 is also coupled to the sensing cylinder H and by the valve H through a conventional quick exhaust valve 340 to the lift cylinder D.

OPERATION

The operator dresses the sleeves of a shirt to be pressed upon the bucks 26 and 27. The cap member 158 associated with buck 27 is first actuated thus actuating valve $G_1$ and the clamp and expand cylinder $G_1$ associated with buck 27, through the normally open pedal valve P, thus moving the expanders 117 and 118 of buck 27 to their expanded positions. Cap 158 associated with buck 26 is then actuated which actuates valve $G_2$ and the clamp and expand cylinder $G_2$ associated with buck 26 also through the normally open pedal valve P, thereby to actuate the expanders 117 and 118 associated with that buck to their expanded positions. Sensing cylinder H is also actuated to apply the bias force on the operating rod 208 and sensing rod 204. Valve H is normally open and thus lift cylinder D is actuated to initiate upward movement of the bucks 26 and 27, upward movement being terminated by actuation of valve H in response to sensing of the upward passage of the shoulder seam by the distal end 207 of the sensing rod 204. If there should be a need at this point to release the clamps and expanders, the operator may manually actuate pedal 362 which will move rod 365 upwardly to actuate pedal valve P to its exhaust position, thereby to permit cylinders G, $G_2$ and the lift and sensing cylinders D and H to exhaust through exhaust port 366 of pedal valve P.

The operator then actuates one or the other of the control levers 249, 250 thereby actuating valve A to actuate the tilt cylinder A to move the buck assembly 25 from its dressing position to its pressing position with the bucks 26 and 27 respectively between the pressing heads 34, 35 and 36. When the buck assembly 25 has reached its pressing position, valve B is actuated (valves C and D being closed) thereby applying high pressure air to the hollow poston rod 298 of the clamp cylinder B which accordingly extends to cause the lever members 45 and 46 and the moveable pressing heads 34 and 36 to close rapidly and sufficiently to cause the moveable pressing heads to "touch" the bucks 26 and 27. Meanwhile timing cylinder C was charged when air was supplied to the system through pilot valve 293 and the metering check valve 336, and its piston rod 287 extended.

Pilot valve 293 is of the air-piloted, spring-returned type. The high pressure air in line 328 normally holds the spool of pilot valve 293 against its spring (not shown) so that the valve 293 normally couples line 328 to both ports 314 and 316 of the clamp cylinder B, the large cylinder 304 thus normally being filled with high pressure air. It will be observed that as the hollow piston rod 298 moves outwardly in the direction shown by the arrow 342 in FIG. 15, in response to application of high pressure air to port 318, there is no contact between the large piston 306 and the wall of the large cylinder 304 until the large piston comes into sealing contact with the reduced-diameter wall portion 310 adjacent the end of its stroke.

The hollow piston rod 298 has now closed the movable heads 34, 36 and has also moved the large piston 306 into sealing contact with the reduced diameter wall portion 310 of the large cylinder 304. At this point, pressure has built up through needle valve 394 which, when added to the internal spring pressure, overcomes the high pressure air supplied to pilot valve 293 by line 328 causing the spool of that valve to shift.

Shifting of the spool of pilot valve 293 connects port 316 to a metered exhaust 344 thereby to exhaust the air in the reduced-diameter portion 310 of the large cylinder 304. However, air is exhausted only from one side of the large piston 306 by reason of its sealing contact with the reduced-diameter wall portion 310, port 314 remaining connected to the high pressure line 328 thus applying full pressure to the other side of the large piston 306, in addition to the pressure applied by line 329 to the small piston 229, so that a greatly increased "squeezing" force is exerted on the lever members 45 and 46 and the movable heads 34 and 36.

Shifting of the spool in the pilot valve 293 to provide the "squeezing" force initiates bleeding of the timing cylinder C through the line 335 thereby initiating the timing operation.

Retraction of the timing cylinder C, as above described, and the resultant return of the control lever member 233 to its deactuated position deactuates valve B and actuates valve C to couple the hollow piston rod 298 to the bleeder valve 372. Deactuation of valve B removes the biasing pressure from the spool of the pilot valve 293 which then again shifts to couple both of the inlet supports 314 and 316 to the high pressure line 328. Retraction of the hollow piston rod 298 then commences under the influence of spring 53 thereby initiating opening movement of the lever members 45 and 46 and the moveable heads 34 and 36. Valve A is also deactuated thereby to actuate the tilt cylinder A with the buck assembly 25 thus returning to its dressing position under the influence of its own weight. As the lower end 52 of lever member 46 moves in the direction shown by the arrow 297 in FIG. 13, valve D is actuated thereby to permit rapid exhaust of hollow piston rod 298 through valves C and D and the muffler 333. Valve E is deactuated simultaneously with actuation of valve D thereby to terminate the supply of heated air to the pressing heads 32 and 33.

The retraction of the tilt cylinder A to its lower position and the accompanying downward movement of lever member 63 results in deactuation of valve F and of the bucks swivel cylinder F resulting in outward pivoting of the bucks under the influence of springs 107 (FIG. 4).

It will be observed that retraction of the timing cylinder C and the accompanying upward movement of the control lever member 233 to its deactuated position has resulted in return of the control lever member 249, 250 to their normal positions.

As the snubber rod 68 moves downwardly in the direction 70a, simultaneously with retraction of piston rod 69 of the tilt cylinder A, pin 368 will actuate lever 372 and cam 373, as above described, thereby automatically to actuate pedal valve P to its exhaust position to exhaust the clamp and expand cylinders $G_1$ and $G_2$, and the lift and sensing cylinders D and H, thus retracting the expanders 117 and 118 and releasing the clamps 164 of the bucks 26 and 27, causing the buck assembly to move downwardly to its lowest position, and returning operating rod 208 and sensing rod 204 to their normal positions. It will be understood that manual deactuation of the clamp and expand valves $G_1$ and $G_2$ will not release the clamps and expanders, and retract the lift and sensing cylinders D and H sufficiently rapidly due to the air pressure in the cylinders, thus necessitating provision of the pedal valve P to provide a rapid exhaust. The sleeve pressing operation is now completed and the operator can now remove the sleeves of the garment from the bucks 26 and 27. In an actual embodiment constructed as shown in the drawings, the complete cycle of operation requires approximately eighteen seconds.

While there have been described above the principles of this invention in connection with specific apparatus, it is to be clearly understood that this description is made only by way of example and not as a limitation to the scope of the invention.

What is claimed is:

1. Apparatus for pressing the sleeves of a garment comprising: a buck assembly including a pair of elongated, transversely spaced-apart, upstanding bucks for respectively receiving the sleeves of a garment with the body portion thereof hanging downwardly therefrom and first power means for upwardly moving said bucks in the direction of elongation thereof between a lower position and selective upper positions; a pair of pressing heads for each of said bucks respectively formed to conform thereto; second power means for relatively transversely moving said pairs of pressing heads between an open position for receiving the respective buck therebetween, and a closed pressing position; third power means for moving said buck assembly between an initial dressing location and a pressing location with each said buck positioned between and in cooperative relationship with a said pair of pressing heads; means for actuating said first power means thereby to initiate said upward movement of said bucks; means cooperating with a sleeve on one of said bucks for sensing upward movement of said bucks to a position in which the junction of said sleeve and said body portion of said garment is at a predetermined elevation; and means coupling said first power means and said sensing means and operable thereby to deactuate said first power means thereby to terminate said upward movement of said bucks at said last-named position, said last-named position being such that only that portion of said bucks having said sleeves thereon is positioned between the respective pair of pressing heads at said pressing location of said buck assembly thereby to accommodate sleeves of different sizes and lengths.

2. The apparatus of claim 1 wherein said sensing means includes a sensing element having an initial position between said one buck and the inner surface of the respective sleeve when said bucks are in said lower position, said element being movable to a second position in response to upward movement of said bucks to said last-named position thereby operating said coupling means to deactuate said first power means.

3. The apparatus of claim 1 wherein said sensing means is initially disposed between said one buck and the inner surface of the respective sleeve when said bucks are in said lower position, said sensing mean having a fixed spaced relationship to said first power means and establishing said elevation, said sensing means including means for detecting the passing of said junction as said bucks move upwardly.

4. The apparatus of claim 1 wherein said sensing means includes an elongated element having opposite ends, means for mounting one end of said element in fixed spaced relation to said first power means, said element extending upwardly in said direction, said element having an initial position with the distal end thereof being closely adjacent said one buck in said lower position thereof whereby said distal end is initially positioned between said one buck and the inner surface of the respective sleeve, said element being of predetermined length and said distal end determining said elevation, and means for moving said element to a second position in response to said distal end passing said junction as said bucks move upwardly thereby operating said coupling means to deactuate said first power means.

5. The apparatus of claim 4 further comprising means for normally biasing said element toward said second position thereof.

6. The apparatus of claim 4 wherein said mounting means comprises means for mounting said element for pivotal movement between said initial and second positions in a direction transverse to said first-named direction.

7. The apparatus of claim 6 wherein said element is a relatively rigid rod.

8. The apparatus of claim 4 wherein said coupling means comprises control means for said first power means coupled to said element and actuated in response to movement thereof to said second position thereby to deactuate said first power means.

9. The apparatus of claim 6 further comprising a frame having a base portion, said third power means acting between said frame and said first power means, said mounting means further comprising means for mounting said one end of said element on said first power means, said elevation being with respect to said base portion, said element being a relatively rigid member, support means connecting said first power means to said bucks and upwardly movable therewith, said coupling means comprising an operating member pivotally connected to said support means and upwardly movable therewith, said operating member having a sliding connection with said element and being pivotally movable between initial and second positions corresponding to the respective position of said element, means for selectively biasing said operating member toward said second position whereby said element is biased toward its second position, said element and operating member being maintained in said first position thereof when said distal end is between said one buck and said sleeve and moving to said second position when said distal end passes said junction, and control means for said first power means coupled to said operating member and actuated in response to movement thereof to its second position thereby to deactuate said first power means.

10. The apparatus of claim 9 wherein said first power means is a first fluid-actuated cylinder, said control means being a selectively actuable valve coupled to said first cylinder, said biasing means being a second fluid-actuated cylinder, means on said bucks for laterally expanding said sleeves, and a third fluid-actuated cylinder for actuating said expanding means, said first-named actuating means comprising manually-actuated means for simultaneously actuating all of said cylinders.

11. The apparatus of claim 1 wherein said buck assembly further includes first means for mounting said bucks for selective pivotal movement between a dressing position with said bucks facing divergently outwardly in a direction away from said pressing heads and a pressing position with said bucks generally parallel, and second means for mounting said bucks for free compound movement including a first movement toward and away from each other and a second pivotal movement between a position with said bucks facing divergently upwardly and a position with said bucks generally parallel thereby to provide equal pressing pressure when said buck assembly is in said pressing position thereof.

12. The apparatus of claim 11 wherein said first mounting means includes a first support element connected to said first power means and upwardly movable thereby, and a pair of second support elements respectively pivotally connected to said first support element; said second mounting means including a pair of links respectively connecting said bucks to said second supporting element, each of said links having one end pivotally connected to said supporting means and its other end pivotally connected to the respective buck thereby providing said compound motion; means for normally biasing said bucks to said pressing position; and fourth power means for selectively moving said bucks to said pressing position thereof.

13. The apparatus of claim 1 wherein said buck assembly further includes means for mounting said bucks for selective pivotal movement between a dressing position with said bucks facing divergently outwardly in a direction away from said pressing heads and a pressing position with said bucks generally parallel.

14. The apparatus of claim 13 wherein said buck assembly further includes fourth power means for moving said bucks to said pressing position, wherein said actuating means is manually actuated, and further comprising second manually actuated means for simultaneously actuating said third and fourth power means, and means for actuating said second power means in response to movement of said buck assembly to said pressing location.

15. Apparatus for pressing the sleeves of a garment comprising a buck assembly including a pair of elongated, transversely spaced-apart bucks for respectively receiving the sleeves of a garment; a pair of pressing heads for each of said bucks respectively formed to conform thereto; first power means for relatively transversely moving said pairs of pressing heads between an open position for receiving the respective bucks therebetween, and a closed pressing position; second power means for moving said buck assembly between an initial dressing location and a pressing location with each said buck positioned between and in cooperative relationship with a said pair of pressing heads; said buck assembly further including means for mounting said bucks for selective pivotal movement between a dressing position with said bucks facing divergently outwardly in a direction away from said pressing heads and a pressing position with said bucks generally parallel.

16. The apparatus of claim 15 wherein said buck assembly further includes third power means for moving said bucks between said pivotal positions thereof.

17. Apparatus for pressing the sleeves of a garment comprising: a buck assembly including a pair of elongated, transversely spaced-apart bucks for respectively receiving the sleeves of a garment; a pair of pressing heads for each of said bucks respectively formed to conform thereto; first power means for relatively transversely moving said pairs of pressing heads between an open position for receiving the respective bucks therebetween, and a closed pressing position; second power means for moving said buck assembly between an initial dressing location and a pressing location with each said buck positioned between and in cooperative relationship with a said pair of pressing heads; said buck assembly further including means for mounting said bucks for free compound movement including a first movement toward and away from each other and a second pivotal movement between a position with said bucks facing divergently in the direction of elongation thereof and a position with said bucks generally parallel thereby to provide equal pressing pressure when said buck assembly is in said pressing position.

18. The apparatus of claim 17 wherein said mounting means includes supporting means, and a pair of links respectively connecting said bucks to said supporting means, each of said links having one end pivotally connected to said supporting means and its other end pivotally connected to the respective buck thereby providing said compound movement.

19. The apparatus of claim 18 wherein said supporting means includes a first support element, and a pair of second support elements respectively pivotally connected to said first support element, each of said links being pivotally connected at said one end thereof to a respective second support element, said second support elements providing pivotal movement of said bucks between a dressing position with said bucks facing divergently outwardly in a direction away from said pressing heads and a pressing position with said bucks generally parallel, means for normally biasing said bucks to said pressing position, and third power means for selectively moving said bucks to said pressing position thereof.

20. The apparatus of claim 1 wherein each said buck includes a pair of longitudinally spaced-apart sleeve expanders respectively movable between a retracted position and a protracted sleeve-expanding position, and fourth power means for actuating said expanders to said protracted position.

21. The apparatus of claim 20 wherein each said buck includes manually actuated means for clamping the cuff portion of the respective sleeve thereon, and means coupling said manually actuated means to the respective fourth power means for actuating the same.

22. The apparatus of claim 21 wherein said last-named actuating means comprises said manually actuated means for the said one buck.

23. The apparatus of claim 20 wherein each of said expanders includes an elongated element having upper and lower ends; each of said bucks having supporting means connected to said first power means, a first pair of lever members each being pivotally connected to said supporting means and being coupled to the lower end of a respective element, a first equalizing linkage coupling said first lever members to said fourth power means, a second pair of lever members each being pivotally connected to the respective buck and being coupled to the upper end of the respective element, a second equalizing linkage coupling said second lever members to said fourth power means, manually actuated means for clamping the cuff portion of the respective sleeve to said buck, and means coupling said manually actuated means to said fourth power means for actuating the same.

24. Apparatus for pressing the sleeves of a garment comprising: a buck assembly including a pair of elongated, transversely spaced-apart bucks for respectively receiving the sleeves of a garment; a pair of pressing heads for each of said bucks respectively formed to conform thereto; first power means for relatively transversely moving said pairs of pressing heads between an open position for receiving the respective bucks therebetween, and a closed pressing position; second power means for moving said buck assembly between an initial dressing location and a pressing location with each said buck positioned between and in cooperative relationship with a said pair of pressing heads; each said buck including a pair of longitudinally spaced-apart sleeve expanders respectively movable between a retracted position and a protracted sleeve-expanding position, and third power means for actuating said expanders to said protracted position.

25. The apparatus of claim 24 wherein each said buck includes manually actuated means for clamping the cuff portion of the respective sleeve thereon, and means coupling said manually actuated means to the respective third power means for actuating the same.

26. The apparatus of claim 24 wherein each of said expanders has upper and lower ends, and wherein each of said bucks further includes first linkage means coupling the upper ends of said expanders to said third power means, and second linkage means independently coupling the lower ends of said expanders to said third power means whereby said upper and lower ends of said expanders are independently moved outwardly to said protracted position.

27. The apparatus of claim 26 wherein one of said expanders includes flexible means extending between said upper and lower ends and defining the outer perimetral edge of the expander, the other of said expanders being relatively rigid.

28. The apparatus of claim 24 wherein each of said expanders includes an elongated rigid element having upper and lower ends, one of said expanders having a flexible element extending between said upper and lower ends of the respective rigid element and defining the outer perimetral edge of the respective expander, each of said bucks having supporting means, a first pair of lever members each pivotally connected to said supporting means and being coupled to the lower end of a respective rigid element, a first equalizing linkage coupling said first lever members to said third power means, a second pair of lever members each pivotally connected to the respective buck and being coupled to the upper end of a respective rigid element, a second equalizing linkage coupling said second lever members to said third power means, and means for actuating said third power means, actuation of said third power means differentially and separately moving both said upper and lower ends of said elements outwardly to said protracted position of said expanders thereby to accommodate sleeves of different size and configuration.

29. The apparatus of claim 28 wherein each of said bucks further includes manually actuated means at the upper extremity thereof for clamping the cuff portion of the respective sleeve to said buck, said actuating means including linkage coupled to said manually actuated means.

30. The apparatus of claim 1 further comprising a frame, a first lever member pivotally connected to said frame and connected to said first power means, said first lever member moving said buck assembly from said dressing location to said pressing location, a second lever member pivotally connected to said frame, and a link connecting said first and second lever members, said third power means comprising a fluid-actuated cylinder acting upon said second lever member.

31. The apparatus of claim 30 wherein each of said power means is a fluid-actuated cylinder, said first-named actuating means comprising first manually actuated means, and further comprising control means including a control lever member pivotally mounted on said frame for movement between first and second positions, second manually actuated means for moving said lever member to said second position thereof, first valve means coupled to said third cylinder and actuated by said control lever in said second position, second valve means coupled to said second cylinder and actuated in response to actuation of said third cylinder to move said buck assembly to said pressing location, a timing fluid-actuated cylinder coupled to said second valve means, said timing cylinder acting upon said control lever to return the same to said first position after a predetermined pressing time thereby to deactuate said first valve means and third cylinder, and means actuated by said control lever in said first position for deactuating said second cylinder.

32. Apparatus for pressing the sleeves of a garment comprising: a buck assembly including a pair of elongated, transversely spaced-apart, bucks for respectively receiving the sleeves of a garment; a pair of pressing heads for each of said bucks respectively formed to conform thereto; first power means for relatively transversely moving said pairs of pressing heads between an open position for receiving the respective bucks therebetween, and a closed pressing position; second power means for moving said buck assembly between an initial dressing location and a pressing location with each said buck positioned between and in cooperative relationship with a said pair of pressing heads; a frame, a first lever member pivotally connected to said frame and to said buck assembly for moving the same from said dressing location to said pressing location; a second lever member pivotally connected to said frame; and a link connecting said first and second lever members, said second power means comprising a fluid-actuated cylinder acting upon said second lever member.

33. The apparatus of claim 32 wherein said buck assembly and pressing heads are relatively disposed and said first lever member is arranged so that the weight of said buck assembly normally biases the same toward said dressing location.

34. The apparatus of claim 33 further comprising spring means connected to said second lever member and frame for assisting said second power means, and snubbing means connected to said second lever member.

35. The apparatus of claim 27 wherein said one expander includes an elongated rigid element having upper and lower ends with said first and second linkage means being respectively coupled thereto, an elongated flexible element having a lower end connected to said rigid element adjacent its lower end, said flexible element having a central portion spaced from said rigid element, and an upper portion joined to said central portion and including a reverse bend, said flexible element having an upper end and means connecting said upper end of said flexible element to said rigid element adjacent said upper end thereof.

36. The apparatus of claim 35 further comprising a rigid member connecting said rigid element to said flexible element adjacent the junction of said upper and central portion whereby said upper and central portions are independently flexible.

37. The apparatus of claim 35 wherein said upper portion includes a second reverse bend intermediate said first-named reverse bend and said upper end, said connecting means comprising means for providing a sliding connection with said second reverse bend.

38. The apparatus of claim 36 further comprising a guide member having one end connected to said central portion of said flexible element intermediate said lower end thereof and said rigid member, said guide member extending transversely between said flexible element and said rigid element and having a sliding connection therewith.

39. An expander for a sleeve buck comprising an elongated rigid element having first and second ends, an elongated flexible element having opposite ends with one end connected to said rigid element adjacent said first end thereof, said flexible element having a central portion spaced from said rigid element and an upper portion joined to said central portion and including a reverse bend, means connecting the other end of said flexible element to said rigid element adjacent said second end thereof, and a rigid member connecting said rigid element to said flexible element adjacent the junction of said upper and central portions whereby said upper and central portions are independently flexible.

40. The expander of claim 39 wherein said upper portion includes a second reverse bend intermediate said first-named reverse bend and said other end, said connecting means comprising means for providing a sliding connection with said second reverse bend.

41. The expander of claim 39 further comprising a guide member having one end connected to said central portion of said flexible element intermediate said one end thereof and said rigid member, said guide member extending transversely between said flexible element and said rigid element and having a sliding connection therewith.

42. Apparatus for simultaneously clamping and expanding a tubular garment portion having an open end with a split extending longitudinally therefrom defining opposite edges, said apparatus comprising means for supporting said garment portion, means for clamping said spilt in edge-to-edge relationship, means for transversely expanding said garment portion, and actuator means coupled to both said clamping means and said expanding means for simultaneously actuating the same whereby force applied to said expanding means tending to separate said split is accompanied by force applied to said clamping means to hold said edges more securely.

43. The apparatus of claim 42 wherein said actuator means comprises power means, and linkage means independently coupling said power means to said clamping means and to said expanding means.

44. The apparatus of claim 43 wherein said linkage means includes lost motion means for applying further force to said clamping means after expansive movement of said expanding means is restrained.

45. Apparatus for pressing the sleeves of a garment comprising: a buck assembly including a pair of elongated, transversely spaced-apart bucks for respectively receiving the sleeves of a garment and first power means for outwardly moving said bucks in the direction of elongation thereof between a retracted position and selective extended positions; a pair of pressing heads for each of said bucks respectively formed to conform thereto; second power means for relatively transversely moving said pairs of pressing heads between an open position for receiving the respective buck therebetween, and a closed pressing position; third power means for moving said buck assembling between an initial dressing location and a pressing location with each said buck position between and in cooperative relationship with a said pair of pressing heads; means for actuating said first power means thereby to initiate said outward movement of said bucks; means cooperating with a sleeve on one of said bucks for sensing outward movement of said bucks to a position in which the junction of said sleeve and the body portion of said garment is at a predetermined elevation; and means coupling said first power means and said sensing means and operable thereby to deactuate said first power means thereby to terminate said outward movement of said bucks at said last-named position, said last-named position being such that only that portion of said bucks having said sleeves thereon is positioned between the respective pair of pressing heads at said pressing location of said buck assembly thereby to accommodate sleeves of different sizes and lengths.

References Cited

UNITED STATES PATENTS

| | | | |
|---|---|---|---|
| Re. 23,881 | 9/1954 | McLagan | 223—57 |
| 2,727,661 | 12/1955 | Strike | 223—73 |
| 2,729,370 | 1/1956 | Maxwell et al. | 223—73 |
| 2,839,231 | 6/1958 | Strike | 223—73 |
| 3,051,359 | 8/1962 | Gayring | 223—73 |

MERVIN STEIN, Primary Examiner

GEORGE V. LARKIN, Assistant Examiner